(12) United States Patent
Gleeson et al.

(10) Patent No.: US 9,760,939 B2
(45) Date of Patent: *Sep. 12, 2017

(54) SYSTEM AND METHOD FOR DOWNLOADING AN ELECTRONIC PRODUCT TO A PIN-PAD TERMINAL USING A DIRECTLY-TRANSMITTED ELECTRONIC SHOPPING BASKET ENTRY

(71) Applicant: THE TORONTO-DOMINION BANK, Mississauga (CA)

(72) Inventors: Bryan Michael Gleeson, Toronto (CA); Robert Hayhow, Burlington (CA); John Henry Dunstan, Caledon (CA)

(73) Assignee: THE TORONTO-DOMINION BANK, Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/634,604

(22) Filed: Feb. 27, 2015

(65) Prior Publication Data
US 2015/0178730 A1 Jun. 25, 2015

Related U.S. Application Data

(63) Continuation-in-part of application No. 13/460,674, filed on Apr. 30, 2012.
(Continued)

(51) Int. Cl.
*G06Q 30/06* (2012.01)
*G06Q 20/02* (2012.01)
(Continued)

(52) U.S. Cl.
CPC ....... *G06Q 30/0635* (2013.01); *G06Q 20/027* (2013.01); *G06Q 20/123* (2013.01);
(Continued)

(58) Field of Classification Search
None
See application file for complete search history.

(56) References Cited

U.S. PATENT DOCUMENTS 5,798,931 A * 8/1998 Kaehler ................. G06Q 20/20
700/231
5,883,810 A 3/1999 Franklin et al.
(Continued)

FOREIGN PATENT DOCUMENTS

| WO | 2004/092915 A2 | 10/2004 |
|---|---|---|
| WO | 2012002810 | 1/2012 |
| WO | 2012095670 | 7/2012 |

*Primary Examiner* — Mamon Obeid
(74) *Attorney, Agent, or Firm* — Knobbe Martens Olson & Bear LLP

(57) ABSTRACT

A method of downloading an electronic product to a pin-pad terminal involves the pin-pad terminal transmitting to a network gateway a transaction proposal for an electronic product from a network device, and receiving from the network gateway a transaction proposal response generated by the network gateway in response to the transaction proposal. The transaction proposal response includes a transaction pointer associated with the electronic product. The pin-pad terminal electronically directly transmits to an electronic cash register coupled to the pin-pad terminal an indication of a payment amount for the electronic product. The pin-pad terminal receives from the electronic cash register confirmation of entry of the electronic product in an electronic shopping basket maintained by the electronic cash register, and transmits the transaction pointer to the network device via the network gateway. The pin-pad terminal receives the electronic product from the network device via the network gateway.

29 Claims, 17 Drawing Sheets

Related U.S. Application Data

(60) Provisional application No. 61/615,168, filed on Mar. 23, 2012, provisional application No. 61/946,684, filed on Feb. 28, 2014.

(51) Int. Cl.
  *G06Q 20/20* (2012.01)
  *G06Q 20/38* (2012.01)
  *G06Q 20/12* (2012.01)
  *G06Q 20/34* (2012.01)

(52) U.S. Cl.
  CPC ....... *G06Q 20/202* (2013.01); *G06Q 20/3567* (2013.01); *G06Q 20/3821* (2013.01); *G06Q 20/3829* (2013.01); *G06Q 20/38215* (2013.01)

(56) References Cited

U.S. PATENT DOCUMENTS

| Patent/Publication No. | Date | Inventor | Classification |
|---|---|---|---|
| 5,956,259 A * | 9/1999 | Hartsell, Jr. | B67D 7/0401 700/282 |
| 6,035,402 A | 3/2000 | Vaeth et al. | |
| 6,052,629 A * | 4/2000 | Leatherman | G06Q 30/0601 700/216 |
| 6,098,879 A * | 8/2000 | Terranova | B67D 7/067 235/380 |
| 6,192,131 B1 | 2/2001 | Geer et al. | |
| 6,234,389 B1 * | 5/2001 | Valliani | G06Q 20/20 235/379 |
| 6,327,578 B1 * | 12/2001 | Linehan | G06Q 20/02 705/65 |
| 6,535,726 B1 * | 3/2003 | Johnson | G06Q 20/04 235/381 |
| 6,587,563 B1 * | 7/2003 | Crandall | H04L 9/001 380/263 |
| 6,810,304 B1 * | 10/2004 | Dickson | B67D 7/067 700/231 |
| 6,876,978 B1 * | 4/2005 | Walker | G06Q 10/087 705/14.1 |
| 7,117,363 B2 | 10/2006 | Lincoln et al. | |
| 7,237,717 B1 * | 7/2007 | Rao | G07C 13/00 235/386 |
| 7,366,905 B2 | 4/2008 | Paatero | |
| 7,702,588 B2 | 4/2010 | Gilder et al. | |
| 7,707,120 B2 | 4/2010 | Dominguez et al. | |
| 7,753,772 B1 * | 7/2010 | Walker | A63F 13/12 273/138.1 |
| 7,822,635 B1 | 10/2010 | Brown et al. | |
| 7,831,519 B2 | 11/2010 | Kean | |
| 8,041,338 B2 | 10/2011 | Chen et al. | |
| 8,205,240 B2 | 6/2012 | Ansari et al. | |
| 8,286,865 B2 | 10/2012 | Wilson | |
| 8,386,776 B2 | 2/2013 | Gomi et al. | |
| 8,561,892 B2 * | 10/2013 | Hayhow | G06Q 20/3829 235/375 |
| 8,621,595 B2 * | 12/2013 | Hayhow | G06Q 20/3829 380/277 |
| 8,768,838 B1 * | 7/2014 | Hoffman | G06Q 40/00 705/44 |
| 8,769,291 B2 | 7/2014 | Schneider et al. | |
| 8,831,189 B2 * | 9/2014 | Maximo | H04L 63/083 379/93.03 |
| 8,856,514 B2 | 10/2014 | Dixon et al. | |
| 9,152,957 B2 * | 10/2015 | Gleeson | G06Q 20/202 |
| 2001/0034834 A1 | 10/2001 | Matsuyama et al. | |
| 2002/0095588 A1 | 7/2002 | Shigematsu et al. | |
| 2002/0112171 A1 * | 8/2002 | Ginter | G06F 21/10 713/185 |
| 2003/0139972 A1 * | 7/2003 | Parulski | G06Q 30/06 705/27.1 |
| 2004/0010697 A1 | 1/2004 | White | |
| 2004/0032083 A1 * | 2/2004 | Walker | G06Q 10/087 273/269 |
| 2004/0127277 A1 | 7/2004 | Walker et al. | |
| 2004/0193464 A1 * | 9/2004 | Szrek | G06Q 20/202 705/24 |
| 2005/0005098 A1 | 1/2005 | Michaelis et al. | |
| 2005/0114262 A1 * | 5/2005 | Howard | G06Q 20/04 705/40 |
| 2005/0233797 A1 * | 10/2005 | Gilmore | G06Q 20/202 463/17 |
| 2005/0250538 A1 * | 11/2005 | Narasimhan | G06Q 20/12 455/558 |
| 2006/0059342 A1 | 3/2006 | Medvinsky et al. | |
| 2006/0059346 A1 | 3/2006 | Sherman et al. | |
| 2006/0068897 A1 * | 3/2006 | Sanford | G06Q 20/403 463/25 |
| 2006/0153364 A1 | 7/2006 | Beeson | |
| 2006/0181515 A1 * | 8/2006 | Fletcher | G06F 3/04886 345/173 |
| 2006/0255128 A1 * | 11/2006 | Johnson | G06Q 20/12 235/380 |
| 2006/0283940 A1 * | 12/2006 | Kuo | G06Q 20/20 235/383 |
| 2007/0022058 A1 | 1/2007 | Labrou et al. | |
| 2007/0155494 A1 * | 7/2007 | Wells | A63F 13/12 463/35 |
| 2008/0153583 A1 * | 6/2008 | Huntley | G07F 17/32 463/25 |
| 2008/0201575 A1 * | 8/2008 | van der Rijn | H04L 9/321 713/156 |
| 2009/0070256 A1 | 3/2009 | Lundberg | |
| 2009/0106094 A1 * | 4/2009 | DeLine | G06Q 30/0268 705/14.65 |
| 2009/0113533 A1 | 4/2009 | Genty et al. | |
| 2009/0204545 A1 | 8/2009 | Barsukov | |
| 2009/0259590 A1 * | 10/2009 | Carapelli | G06Q 20/32 705/44 |
| 2009/0307133 A1 * | 12/2009 | Holloway | G06Q 20/04 705/44 |
| 2010/0144350 A1 | 6/2010 | Walter et al. | |
| 2010/0222132 A1 * | 9/2010 | Sanford | G06Q 30/02 463/25 |
| 2010/0257578 A1 | 10/2010 | Shukla et al. | |
| 2011/0057027 A1 * | 3/2011 | Grossman | G06Q 30/02 235/379 |
| 2011/0091026 A1 * | 4/2011 | van Oortmarssen | H04L 63/102 379/142.01 |
| 2011/0126264 A1 * | 5/2011 | Dunstan | G06Q 10/06 726/3 |
| 2011/0153479 A1 | 6/2011 | Liu et al. | |
| 2011/0173678 A1 * | 7/2011 | Kaippallimalil | G06F 21/31 726/4 |
| 2011/0185319 A1 * | 7/2011 | Carapelli | G06Q 20/206 715/863 |
| 2012/0122556 A1 * | 5/2012 | Schrotter | G07F 5/24 463/25 |
| 2012/0290416 A1 | 11/2012 | Luevane et al. | |
| 2012/0290474 A1 * | 11/2012 | Hoke | G06Q 40/02 705/40 |
| 2013/0246171 A1 * | 9/2013 | Carapelli | G06Q 20/3278 705/14.51 |
| 2014/0051507 A1 * | 2/2014 | Shapiro | G07F 17/3218 463/29 |
| 2014/0114856 A1 * | 4/2014 | Jung | G06Q 20/3278 705/44 |
| 2014/0244408 A1 * | 8/2014 | Grubel, Jr. | G06Q 30/0633 705/15 |
| 2014/0256397 A1 * | 9/2014 | Walker | G07C 15/00 463/17 |
| 2014/0337237 A1 * | 11/2014 | Hayhow | G06Q 20/3829 705/71 |
| 2015/0051991 A1 * | 2/2015 | Riddiford | G06Q 30/0603 705/15 |
| 2015/0170126 A1 * | 6/2015 | Gleeson | G06Q 20/202 705/21 |
| 2015/0178730 A1 * | 6/2015 | Gleeson | G06Q 20/027 705/72 |

(56) References Cited

U.S. PATENT DOCUMENTS

2015/0221149 A1* 8/2015 Main .................. G07C 9/00119
340/5.61
2016/0042201 A1* 2/2016 Ninomiya ............... G06F 21/84
726/26
2016/0307171 A1* 10/2016 Haga .................... G06Q 10/105

* cited by examiner

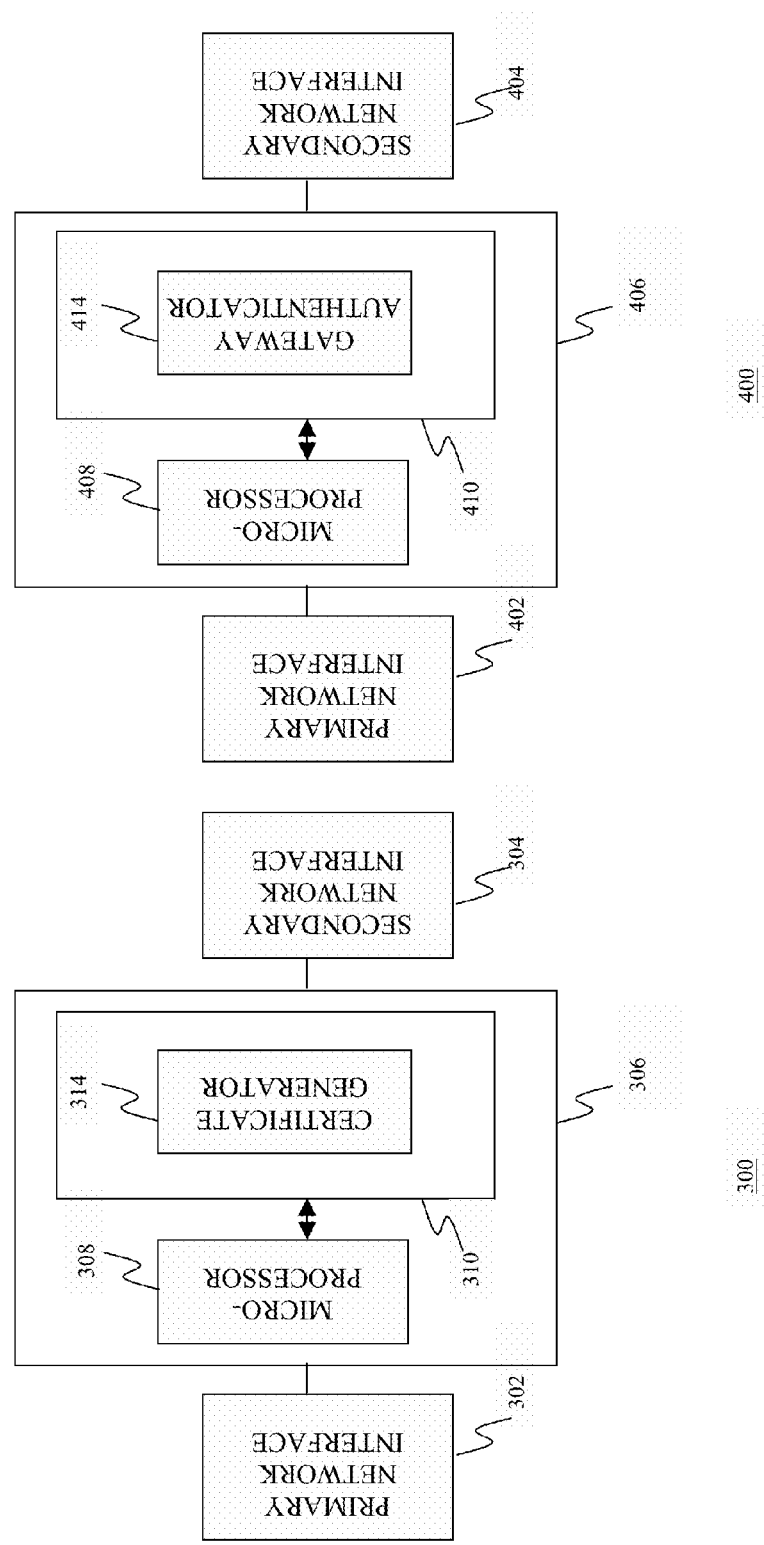

SYSTEM AND METHOD FOR DOWNLOADING AN ELECTRONIC PRODUCT TO A PIN-PAD TERMINAL USING A DIRECTLY-TRANSMITTED ELECTRONIC SHOPPING BASKET ENTRY

CROSS-REFERENCE TO RELATED APPLICATIONS

This patent application claims the benefit of priority under 35 U.S.C. §119(e) of U.S. provisional application No. 61/946,684, filed Feb. 28, 2014, and is a continuation-in-part of U.S. patent application Ser. No. 13/460,674, filed Apr. 30, 2012, which claims the benefit of priority under 35 U.S.C. §119(e) of U.S. provisional application No. 61/615,168, filed Mar. 23, 2012, the disclosures of which are all hereby incorporated by reference herein in their entireties.

FIELD

This patent application relates to systems and methods for communications terminal authentication. In particular, this patent application describes systems and methods for authenticating a pin-pad terminal.

BACKGROUND

Many merchants provide electronic pin-pad terminals to allow customers to purchase goods and services by means other than cash payment. The pin-pad terminals are connected to a secure payment (acquirer) network which interfaces with the merchants' respective financial institutions. The pin-pad terminals are deployed with proprietary software that uses the acquirer network to securely process electronic payments via payment account information received from hardware tokens (e.g. credit cards, debit cards) that may be interfaced with the pin-pad terminals.

SUMMARY

By way of overview, in a first aspect this disclosure relates to a method of authenticating a payment terminal. The first aspect of this disclosure also relates to a payment terminal, and a computer-readable medium having computer processing instructions stored thereon that implement the payment terminal and the method of authenticating a payment terminal.

The method of the first aspect of this disclosure involves the payment terminal generating a terminal activation request from a private cryptographic key, and from at least one terminal credential that is uniquely associated with the payment terminal. The terminal activation request includes a public cryptographic key. The public cryptographic key and the private cryptographic key comprise an asymmetric cryptographic key pair.

The payment terminal transmits the terminal activation request to a certificate server, and receives an activation response from the certificate server in response to the terminal activation request. The activation response includes a digital authentication certificate. The digital authentication certificate includes the public cryptographic key. The payment terminal authenticates to a computer server, distinct from the certificate server, using the digital authentication certificate.

In a second aspect, this disclosure relates to a method of authenticating a payment terminal. The second aspect of this disclosure also relates to a certificate server, and a computer-readable medium having computer processing instructions stored thereon that implement the certificate server and the method of authenticating a payment terminal.

The method of the second aspect of this disclosure involves a certificate server receiving a terminal activation request from a payment terminal. The terminal activation request includes a digital signature and a public cryptographic key. The certificate server determines a validity of the terminal activation request by verifying that the digital signature was generated from a private cryptographic key uniquely associated with the payment terminal and that the public cryptographic key and the private cryptographic key comprise an asymmetric cryptographic key pair.

In accordance with the terminal activation request validity determining, the certificate server generates an activation response in response to the terminal activation request and transmits the activation response to the payment terminal. The activation response comprises a digital authentication certificate that includes the public cryptographic key and facilitates authentication of the payment terminal to a computer server, distinct from the certificate server.

In a third aspect, this disclosure relates to a method of network gateway authenticating. The third aspect of this disclosure also relates to an authentication network, a network gateway, and a computer-readable medium having computer processing instructions stored thereon that implement the network gateway and the method of network gateway authenticating.

The method of the third aspect of this disclosure involves a network gateway receiving an authentication request from a communications terminal. The communications terminal is in communication with an identity token. The authentication request includes a token cryptogram generated from a cryptographic key stored on the identity token.

The network gateway transmits the authentication request to a communications network, and receives an authentication response from the communications network in response to a validity of the token cryptogram. The authentication response includes a gateway authentication certificate. The gateway authentication certificate is configured to authenticate the network gateway to a network device of the communications network.

The authentication network of the third aspect of this disclosure, comprises a communications terminal and a network gateway. The communications terminal includes a token interface for interfacing an identity token with the communications terminal. The network gateway is in communication with the communications terminal, and is configured to (i) receive an authentication request from the communications terminal, and (ii) transmit the authentication request to a communications network. The authentication request includes a token cryptogram generated from a cryptographic key stored on the identity token. The network gateway receives an authentication response from the communications network in response to a validity of the token cryptogram. The authentication response includes a gateway authentication certificate that is configured to authenticate the network gateway to a network device of the communications network.

In a fourth aspect, this disclosure relates to a method of completing a transaction with a pin-pad terminal. The fourth aspect of this disclosure also relates to a pin-pad terminal, and a computer-readable medium having computer processing instructions stored thereon that implement the pin-pad terminal and the method of completing a transaction with a pin-pad terminal.

The method of the fourth aspect of this disclosure involves a pin-pad terminal transmitting to a network gateway via a first communications network a transaction proposal identifying a proposed transaction with a network device, and receiving from the network gateway a transaction proposal response in response to the transaction proposal. The transaction proposal response specifies a pointer to the proposed transaction. The network gateway is configured to authenticate to the network device via a second communications network that comprises the network device.

The pin-pad terminal transmits over an acquirer network, distinct from the communications networks, payment particulars for effecting payment for the proposed transaction, and receives from the acquirer network a payment confirmation in response to the payment particulars. In accordance with the payment confirmation, the pin-pad terminal initiates completion of the proposed transaction by generating a transaction completion request and transmitting the transaction completion request to the network device via the network gateway. The transaction completion request is generated from the transaction pointer, and requests completion of the proposed transaction with the network device.

In one variation, the method of completing a transaction involves a network gateway receiving from the pin-pad terminal a transaction proposal identifying particulars of a proposed transaction with the network device, and transmitting to the pin-pad terminal a transaction proposal response in response to the transaction proposal. The transaction proposal response specifies a pointer to the proposed transaction and includes an indication of the payment particulars for completion of the proposed transaction. The network gateway is configured to authenticate to the network device via a communications network that comprises the network device.

The pin-pad terminal uses the indication of payment particulars to effect payment for the proposed transaction, and then transmits a transaction completion request to the network gateway. The transaction completion request requests completion of the proposed transaction with the network device. The pin-pad terminal generates the transaction completion request from the transaction pointer.

The network gateway generates a transaction request message from the transaction completion request, and transmits the transaction request message to the network device via the communications network. The transaction completion request identifies the particulars of the proposed transaction.

In a fifth aspect, this disclosure relates to a method of downloading an electronic product to a pin-pad terminal. The fifth aspect of this disclosure also relates to a pin-pad terminal, and a computer-readable medium having computer processing instructions stored thereon that implement the pin-pad terminal and the method of downloading the electronic product to the pin-pad terminal.

The method of the fifth aspect of this disclosure involves the pin-pad terminal transmitting to a network gateway a transaction proposal for an electronic product from a network device, and receiving from the network gateway a transaction proposal response generated by the network gateway in response to the transaction proposal. The transaction proposal response includes a transaction pointer associated with the electronic product.

An electronic cash register receives an indication of a proposed payment amount for the electronic product. The pin-pad terminal receives from the electronic cash register confirmation of entry of the electronic product in an electronic shopping basket maintained by the electronic cash register.

The pin-pad terminal validates the confirmation of entry of the electronic product from a comparison with the transaction proposal response, and transmits the transaction pointer to the network device via the network gateway. The pin-pad terminal then receives the electronic product from the network device via the network gateway.

In a sixth aspect, this disclosure relates to a method of downloading an electronic product to a pin-pad terminal. The sixth aspect of this disclosure also relates to a pin-pad terminal, and a computer-readable medium having computer processing instructions stored thereon that implement the pin-pad terminal and the method of downloading the electronic product to the pin-pad terminal.

The method of the sixth aspect of this disclosure involves the pin-pad terminal transmitting to a network gateway a transaction proposal for an electronic product from a network device, and receiving from the network gateway a transaction proposal response generated by the network gateway in response to the transaction proposal. The transaction proposal response includes a transaction pointer associated with the electronic product.

The pin-pad terminal electronically directly transmits to an electronic cash register coupled to the pin-pad terminal an indication of a payment amount for the electronic product. The pin-pad terminal receives from the electronic cash register confirmation of entry of the electronic product in an electronic shopping basket maintained by the electronic shopping basket, and transmits the transaction pointer to the network device via the network gateway. The pin-pad terminal then receives the electronic product from the network device via the network gateway.

BRIEF DESCRIPTION OF THE DRAWINGS

The foregoing aspects of this disclosure will now be described, by way of example, with reference to the accompanying drawings, in which:

FIG. 3 is a schematic view of the certificate server of the authentication network;

FIG. 4 is a schematic view of the network gateway of the authentication network;

DETAILED DESCRIPTION

Authentication Network—Overview

Figure 1:
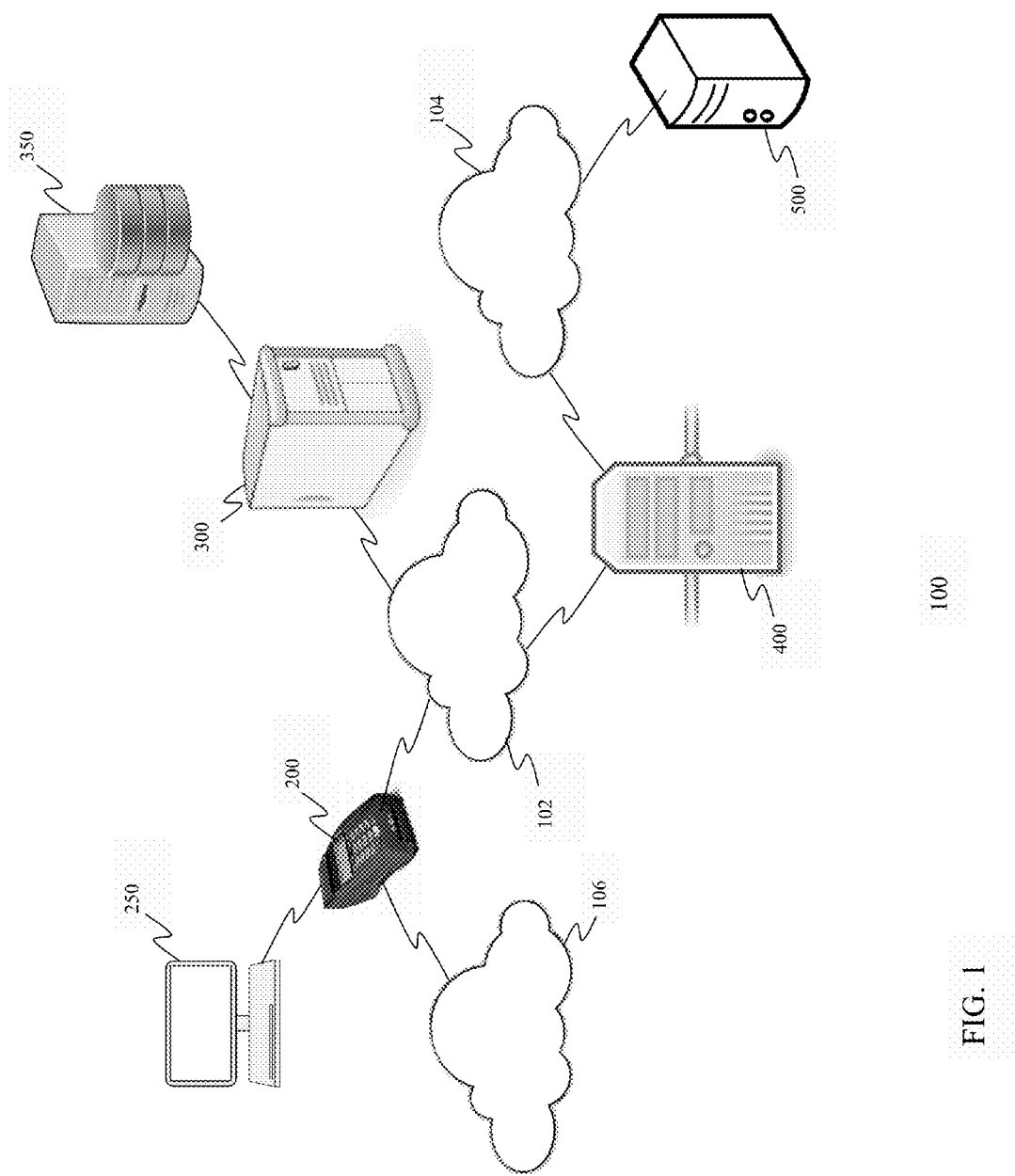
FIG. 1 is a block diagram that illustrates the various components of the authentication network.

Turning to FIG. 1, there is shown an authentication network, denoted generally by reference number 100, that includes a communications terminal 200 and a network gateway 400. Preferably, the authentication network 100 also includes a certificate server 300 and a terminal management server 350. Although the authentication network 100 is shown comprising only a single communications terminal 200, typically the authentication network 100 includes a plurality of the communications terminals 200.

Similarly, although the authentication network 100 is shown comprising only a single certificate server 300 and a single network gateway 400, the authentication network 100 may include a plurality of certificate servers 300 and/or a plurality of the network gateways 400. Further, although the network gateway 400 is depicted as a monolithic network component, the functionality of the network gateway 400 may be split amongst multiple network components or servers.

The communications terminal 200 typically comprises a wireless or wired communications device. Preferably, the communications terminal 200 is implemented as a point-of-sale (POS) terminal and is configured to interface with an identity token 210 and/or to an electronic cash register (ECR) 250. As non-limiting examples, the POS terminal 200 may comprise a passive/integrated ("dumb") pin-pad, or a semi-integrated ("smart") pin-pad. Alternately, the communications terminal 200 may be comprise an automated teller machine (ATM), or automated banking machine (ABM). The communications terminal 200 and the identity token 210 will be discussed in further detail below.

The certificate server 300 may be implemented on one or more computer servers, and is configured to communicate with the communications terminal(s) 200 via a first communications network 102. Typically, the first communications network 102 comprises a wireline or wireless packet-switched (e.g. internet protocol or "IP", 3G, 4G) or circuit-switched network (e.g. public switched telephone network or "PSTN"). The certificate server 300 is also configured to facilitate authentication of the communications terminal(s) 200 to the network gateway 400, by issuing terminal authentication certificates to the communications terminals 200.

The terminal management server 350 may include a database of records, each associated with a respective communications terminal 200. As will be discussed below, the certificate server 300 may make use of the terminal management server 350 to validate the communications terminals 200.

The network gateway 400 may be implemented on one or more computer servers, and is configured to communicate with the communications terminal(s) 200 via the first communications network 102 and to authenticate the communications terminal(s) 200. Preferably, the network gateway 400 is separate and distinct from the certificate server 300. If the authentication network 100 includes a plurality of the network gateways 400, each network gateway 400 may communicate with a respective portion of the communications terminal(s) 200 via a respective first communications network 102.

As will be explained in further detail below, the network gateway 400 is also configured to authenticate itself to a second communications network 104, that is distinct from the first communications network 104, and thereby allow users of the communications terminals 200 to complete electronic transactions with network devices 500 of the second communications network 104. Typically, the second communications network 102 comprises a packet-switched network, and the network device 500 comprises a computer server.

One of more of the communications terminals 200 also be configured to communicate with the merchant's secure acquirer network 106, that is distinct from the communications networks 102, 104, to thereby effect payment for the electronic transaction.

As used herein, an "electronic transaction" is any electronic transaction (e.g. purchase of goods/services, bill payment, funds transfer, bank account or credit card balance query) that is performed by a network device and is available at the communications terminal 200. In a preferred implementation, the communications terminal 200 is a pin-pad terminal, the network device is a computer server, and the electronic transaction involves using the pin-pad terminal 200 to purchase lottery tickets from the computer server. It should be understood, however, that the invention described herein is not so limited to this particular implementation.

Communications Terminal/Identity Token

Figure 2:
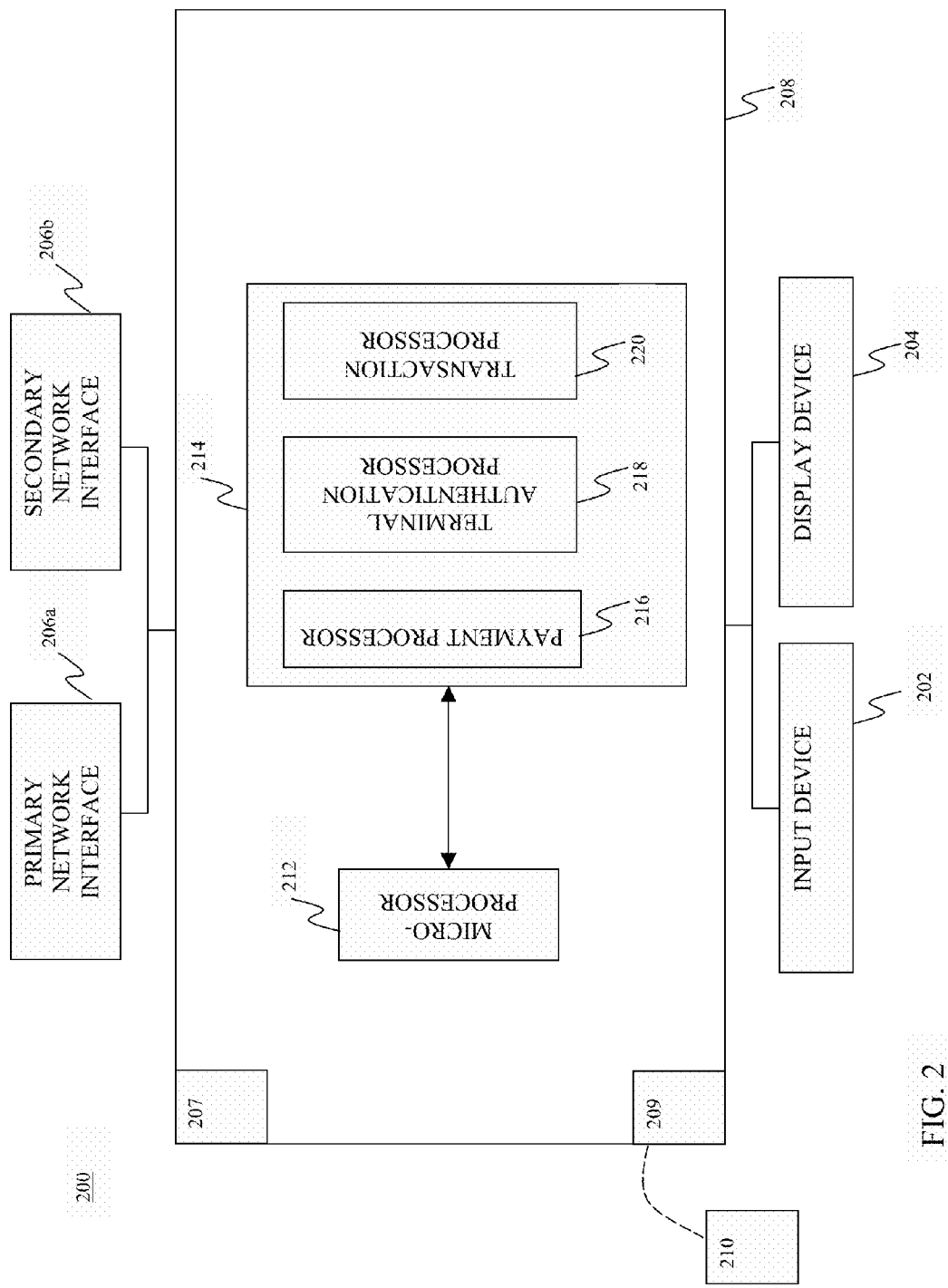
FIG. 2 is a schematic view of the communications terminal of the authentication network.

As mentioned, the communications terminal 200 is typically implemented as a wireless or wired point-of-sale terminal. As shown in FIG. 2, the communications terminal 200 includes a user interface/input device 202, a display device 204, a first network interface 206a, a second network interface 206b, an ECR interface 207, and a computer processing unit 208 that is coupled to the input device 202, the display device 204, the network interfaces 206a, 206b and the ECR interface 207. Preferably, the input device 202, the display device 204, the network interfaces 206a, 206b, the ECR interface 207 and the computer processing unit 208 are integrated together within a common housing. The communications terminal 200 may also include a contact/contactless token interface 209 that is coupled to the computer processing unit 208 and is configured to communicate with the identity token 210.

The input device 202 may be implemented as a keyboard, touchpad, and/or touchscreen and/or other input device suitable for allowing an operator of the communications terminal 200 to input data and/or commands into the communications terminal 200. The display device 204 may comprise a liquid crystal display (LCD) panel, cathode ray tube (CRT) display, plasma display panel, and/or paper printer and/or other output device suitable for displaying information to the operator of the communications terminal 200.

The first network interface 206a interfaces the communications terminal 200 with the first communications network 102. The second network interface 206b interfaces the communications terminal 200 with the secure acquirer network 106. The ECR interface 207 may be used to interface the communications terminal 200 with the electronic cash register (ECR) 250. The ECR interface 207 may comprise a serial port for accepting a wired connection with the ECR 250, or may comprise a wireless interface for wireless communication with the ECR 250.

The computer processing unit 208 may include a microprocessor 212 and computer-readable medium 214. The computer-readable medium 214 may be provided as electronic computer memory (e.g. FLASH memory) that may store one or more credentials ("terminal credentials") that are uniquely associated with the communications terminal 200. As non-limiting examples, the terminal credentials may comprise a terminal identifier (terminal ID) and/or a serial number of the communications terminal 200. The memory 214 may also store computer processing instructions stored thereon which, when executed by the microprocessor 212, define an operating system (not shown) that allows the communications terminal 200 to accept user input from the input device 202 and to control the display device 204 and the token interface 209. Preferably, the computer processing instructions also define a payment processor 216 which allows the operator of the communications terminal 200 to use the acquirer network 106 to pay for a transaction.

The identity token 210 typically comprises a self-contained integrated circuit device that includes a built-in micro-controller and protected memory. The micro-controller and protected memory together provide a secure self-contained computing environment for running cryptographic (e.g. data encryption standard (DES), triple-DES, advanced encryption standard (AES)) algorithms.

The identity token 210 may have a contactless (e.g. NFC and/or ISO 14443 based) form factor, and may communicate with the communications terminal 200 via a wireless protocol, such as ISO 14443. For example, the identity token 210 may be implemented as a contactless smartcard or integrated circuit card (e.g. credit card, debit card) or within a wireless telephone or wireless data messaging device, and the token interface 209 may be configured to communicate with the identity token 210 using near-field communication or Bluetooth. Alternately, the identity token 210 may have a contact form factor, and may interface directly with the communications terminal 200. For example, the identity token 210 may be implemented as a contact-style smartcard or integrated circuit card (e.g. credit card, debit card). The token interface 209 may be configured to communicate with the identity token 210 via a physical port (e.g. card reader) of the communications terminal 200.

Typically, the protected memory of the identity token 210 is configured with a cryptographic key ("token cryptographic key") and one or more credentials ("administrator credentials") that were uniquely assigned to the intended recipient of the identity token 210 by the issuer of the identity token 210. As non-limiting examples, the administrator credentials may comprise an administrator identifier ("sysID") and/or an administrator passcode. The administrator credentials and token cryptographic key may be stored in the protected memory at the time the identity token 210 is manufactured or prior to delivery of the identity token 210 to the intended individual.

Preferably, the administrator credentials and the stored token cryptographic key are uniquely associated with the identity token 210. Further, typically the stored token cryptographic key is a private cryptographic key that is not publicly available, but is either known or can be re-generated only by the issuer of the identity token 210. As will be discussed below, the identity token 210 may use the administrator sysID and the token cryptographic key in the cryptographic algorithms to generate cryptograms ("token cryptograms") that are used by the second communications network 104 to authenticate the communications terminal 200 to the second communications network 104.

The computer processing instructions of the memory 214 may define a terminal authentication processor 218 that allows the communications terminal 200 to authenticate to the network gateway 400, and a transaction processor 220 that allows the communications terminal 200 to complete a transaction with a network device 500 of the second communications network 104. Although the terminal authentication processor 218 and the transaction processor 220 may be implemented as computer processing instructions, all or a portion of the functionality of the terminal authentication processor 218 and the transaction processor 220 may be implemented instead in electronics hardware, such as a field programmable logic gate array (FPGA) or a complex programmable logic device (CPLD).

The terminal authentication processor 218 is configured to generate a terminal activation request from a private cryptographic key (activation code) and from at least one of the terminal credentials (e.g. terminal ID, terminal serial number) that are uniquely associated with the communications terminal 200. As will be discussed below, the administrator of the communications terminal 200 may manually input the private cryptographic key (activation code) into the communications terminal 200 via the input device 202. Alternately, the activation code may be stored on an identity token (e.g. identity token 210), and the administrator may input the activation code into the communications terminal 200 by interfacing the identity token with the communications terminal 200.

The terminal activation request includes a public cryptographic key. Preferably, the public cryptographic key and the activation code comprise an asymmetric cryptographic key pair. The terminal authentication processor 218 may implement a cryptographic (e.g. data encryption standard (DES), triple-DES, advanced encryption standard (AES)) algorithm, and may generate the public cryptographic key from the activation code. Preferably, the terminal activation request also includes at least one of the terminal credentials, and the terminal authentication processor 218 uses the activation code and the cryptographic algorithm to digitally-sign the terminal activation request.

The terminal authentication processor 218 is configured to transmit the terminal activation request to the certificate server 300, and to save in the memory 214 an activation response that is received from the certificate server 300 in response to the terminal activation request. The activation response includes a digital terminal authentication certificate. The terminal authentication certificate includes the public cryptographic key that was included with the terminal activation request. Typically, the terminal authentication certificate is digitally-signed by the certificate server 300.

The terminal authentication processor 218 is configured to authenticate the communications terminal 200 to the certificate server 300 and/or to a computer server, distinct from the certificate server 300, using the saved terminal authentication certificate. In the embodiment described below, the terminal authentication processor 218 uses the terminal authentication certificate to authenticate to the network gateway 400, and may also use the terminal authentication certificate to authenticate to certificate server 300 in order to renew the terminal authentication certificate. However, it should be understood that the terminal authentication certificate may be used to authenticate the communications terminal 200 to any network device that is accessible, directly or indirectly, to the communications terminal 200.

The transaction processor 220 is configured to generate a transaction proposal from one or more of the administrator credentials (e.g. sysID, administrator passcode), and to transmit the transaction proposal to the network gateway 400, via the first network interface 206a. The transaction proposal identifies a proposed transaction that the operator of the communications terminal 200 proposes to engage in with a network device 500 of the second communications network 104. Accordingly, the transaction proposal may also include payment particulars for the proposed transaction or include one or more predefined transaction identifiers which the network gateway 400 can use to calculate or otherwise determine the payment particulars.

The transaction processor 220 is configured to receive from the network gateway 400 a transaction proposal response that is issued in response to the transaction proposal. The transaction proposal response specifies a pointer to the proposed transaction. As will be explained below, the network gateway 400 may generate the transaction pointer from the administrator credentials, payment particulars and/or transaction identifiers (if any) that were included in the transaction proposal. Alternately, or additionally, the transaction pointer may comprise a pseudo-random number generated by the network gateway 400. The transaction proposal response may also identify the payment particulars for the proposed transaction. Preferably, the transaction processor 220 saves the transaction proposal response in the memory 214.

The transaction processor 220 may also be configured to transmit over the acquirer network 106, via the second network interface 206b, payment particulars for effecting payment for the proposed transaction, and to receive from the acquirer network 106 a payment confirmation in response to the payment particulars. After payment for the proposed transaction is confirmed, the transaction processor 220 generates a transaction completion request from the administrator credential and the transaction pointer, and transmits the transaction completion request to the network client 500 via the first network interface 206a and the network gateway 400. The transaction completion request requests completion of the proposed transaction with the network device 500.

The payment particulars included with the transaction proposal response may include an indication of the required payment amount for the proposed transaction. The transaction processor 220 may also be configured to electronically transmit the payment amount indication to the electronic cash register 250, via the ECR interface 207, in response to a transaction information request received from the electronic cash register 250, receive from the electronic cash register 250 a payment completion message confirming payment for the proposed transaction, generate the transaction completion request, and transmit the transaction completion request to the network device 500 via the first network interface 206a and the network gateway 400.

The payment completion message may confirm payment in at least the required payment amount for the proposed transaction, and the transaction processor 220 may be configured to validate the payment completion message from a comparison with the transaction proposal response.

Electronic Cash Register

Each electronic cash register (ECR) 250 is deployed in a respective checkout lane of the merchant's store, and interfaces with a pin-pad terminal 200. The ECR 250 includes an input device, a display device, a bar code scanner, and a data processing system that is coupled to the input device, the display device and the bar code scanner.

The input device may be implemented as a keyboard, touchpad, and/or touchscreen and/or other input device suitable for allowing an operator of the ECR 250 to input data and/or commands into the ECR 250. The display device may comprise a liquid crystal display (LCD) panel, cathode ray tube (CRT) display, plasma display panel, and/or paper printer and/or other output device. The bar code scanner may comprise a 1-D and/or 2-D (e.g. Quick Response) bar code scanner.

The data processing system includes a microprocessor and a computer-readable medium that stores computer processing instructions which, when executed by the microprocessor, implement an operating system and an checkout processor. The operating system controls the input device, the display device and the bar code scanner. The data processing system may also include a network interface that interfaces the ECR 250 with a local product code database that associates product codes with particulars (e.g. current price, product name) of goods/services that are being offered for sale by the merchant ("merchant's goods/services").

The checkout processor is configured to use the bar code scanner to read bar codes that may be affixed to or otherwise associated with the merchant goods/services and/or bar codes associated with a transaction initiated by the pin-pad terminal 200 with the network device 500 (e.g. lottery ticket purchase). The checkout processor is also configured to extract product codes (e.g. universal product codes or UPCs) from the bar codes read by the bar code scanner, to save in a local session database or list ("electronic shopping basket") the particulars (e.g. price, name) of each good/service being purchased by the customer, and to calculate the total monetary amount owing for the goods/services in the electronic shopping basket.

Certificate Server/Terminal Management Server

The certificate server 300 is implemented as one or more networked computer servers. As shown in FIG. 3, the certificate server 300 includes a primary network interface 302, a secondary network interface 304, and a computer processing unit 306 that is coupled to the primary network interface 302 and the secondary network interface 304. The primary network interface 302 interfaces the certificate server 300 with the first communications network 102 and allows the certificate server 300 to communicate with the communications terminals 200. The secondary network interface 304 interfaces the certificate server 300 with the terminal management server 350.

The computer processing unit 306 of the certificate server 300 may include a microprocessor 308 and a computer-readable medium 310. The computer-readable medium 310 may be provided as electronic computer memory (e.g. flash memory) or optical or magnetic memory (e.g. compact disc, hard disk) and may include computer processing instructions stored thereon which, when executed by the microprocessor 308, define an operating system (not shown) that controls the overall operation of the certificate server 300.

The computer processing instructions may also implement a certificate generator 314 that generates the terminal authentication certificates which allow the communications terminals 200 to authenticate to the network gateway 400. The certificate generator 314 also allows the communications terminals 200 to renew their respective terminal authentication certificates. Although the certificate generator 314 may be implemented as computer processing instructions, all or a portion of the functionality of the certificate generator 314 may be implemented instead in electronics hardware, such as a field programmable logic gate array (FPGA) or a complex programmable logic device (CPLD).

The certificate generator 314 is configured to receive a terminal activation request from a communications terminal 200, and to determine a validity of the terminal activation request. The terminal activation request includes a digital signature and a public cryptographic key. The certificate generator 314 determines the validity of the terminal activation request by verifying that the digital signature was generated from a private cryptographic key that is uniquely associated with the communications terminal 200, and that the public cryptographic key and the private cryptographic key comprise an asymmetric cryptographic key pair.

As discussed above, the terminal management server 350 may include a database of records, each associated with a respective communications terminal 200. Each database record may identify the terminal credentials (e.g. terminal ID, terminal serial number) that are uniquely associated with the communications terminal 200. The terminal activation request may include the terminal credentials of the communications terminal 200. The certificate generator 314 may determine the validity of the terminal activation request by, before (or after) verifying the digital signature on the terminal activation request, using the terminal management server 350 to verify that the terminal credentials included in the terminal activation request are associated with a common communications terminal 200.

The certificate generator 314 is configured to, in accordance with the terminal activation request validity determination, generate an activation response in response to the terminal activation request and transmit the activation response to the communications terminal 200. The activation response comprises a digital authentication certificate that includes the public cryptographic key and facilitates authentication of the communications terminal 200 to a computer server, distinct from the certificate server 300.

The certificate generator 314 may also be configured to receive from the communications terminal 200 a certificate renewal request requesting renewal of the digital authentication certificate, and to determine a validity of the certificate renewal request. The certificate renewal request may include the public cryptographic key and a further digital signature. The certificate generator 314 may determine the validity of the certificate renewal request by verifying that the digital signature of the certificate renewal request was generated from the private cryptographic key that is uniquely associated with the communications terminal 200 and that the public cryptographic key and the private cryptographic key comprise an asymmetric cryptographic key pair.

The certificate generator 314 may be configured to, in accordance with the certificate renewal request validity determination, generate a renewal response in response to the certificate renewal request and transmit the renewal response to the communications terminal 200. The renewal response may include a renewed digital authentication certificate that includes the public cryptographic key and facilitates authentication of the communications terminal 200 to the computer server. The certificate generator may use the digital authentication certificate (that was included in the activation response) to establish an encrypted connection with the communications terminal 200, and may receive the certificate renewal request from, and transmit the renewal response to, the communications terminal 200 over the encrypted connection.

Network Gateway

The network gateway 400 is implemented as one or more networked computer servers. As shown in FIG. 4, the network gateway 400 includes a primary network interface 402, a secondary network interface 404, and a computer processing unit 406 that is coupled to the primary network interface 402 and the secondary network interface 404. The primary network interface 402 interfaces the network gateway 400 with the first communications network 102 and allows the network gateway 400 to communicate with the communications terminals 200. The secondary network interface 404 interfaces the network gateway 400 with the second communications network 104 and allows the network gateway 400 to communicate with network devices 500 of the second communications network 104.

The computer processing unit 406 may include a microprocessor 408 and a computer-readable medium 410. The computer-readable medium 410 may be provided as electronic computer memory (e.g. flash memory) or optical or magnetic memory (e.g. compact disc, hard disk) and may include computer processing instructions stored thereon which, when executed by the microprocessor 408, define an operating system (not shown) that controls the overall operation of the network gateway 400.

The computer processing instructions may also implement a gateway authenticator 414 that is configured to receive an authentication request from a communications terminal 200, and to transmit the authentication request to a communications network. The authentication request typically includes a token cryptogram that is generated from a cryptographic key that is stored on an identity token 210 that is interfaced with the communications terminal 200.

The gateway authenticator 414 is also configured to receive an authentication response from the communications network in response to a validity of the token cryptogram. The authentication response includes a gateway authentication certificate which the network gateway 400 uses to authenticate to a network device of the communications network. Although the gateway authenticator 414 may be implemented as computer processing instructions, all or a portion of the functionality of the gateway authenticator 414 may be implemented instead in electronics hardware, such as a field programmable logic gate array (FPGA) or a complex programmable logic device (CPLD).

In the embodiment described below, the network gateway 400 transmits the authentication request to, and receives the authentication response from the second communications network 104, and uses the gateway authentication certificate to authenticate to a network device 500 of the second communications network 104. However, this configuration is not essential; the network gateway 400 may transmit the authentication request to any network device that can issue a gateway authentication certificate which the network gateway 400 may require to access a particular network.

Terminal Authentication Processing—Overview

Figure 5:
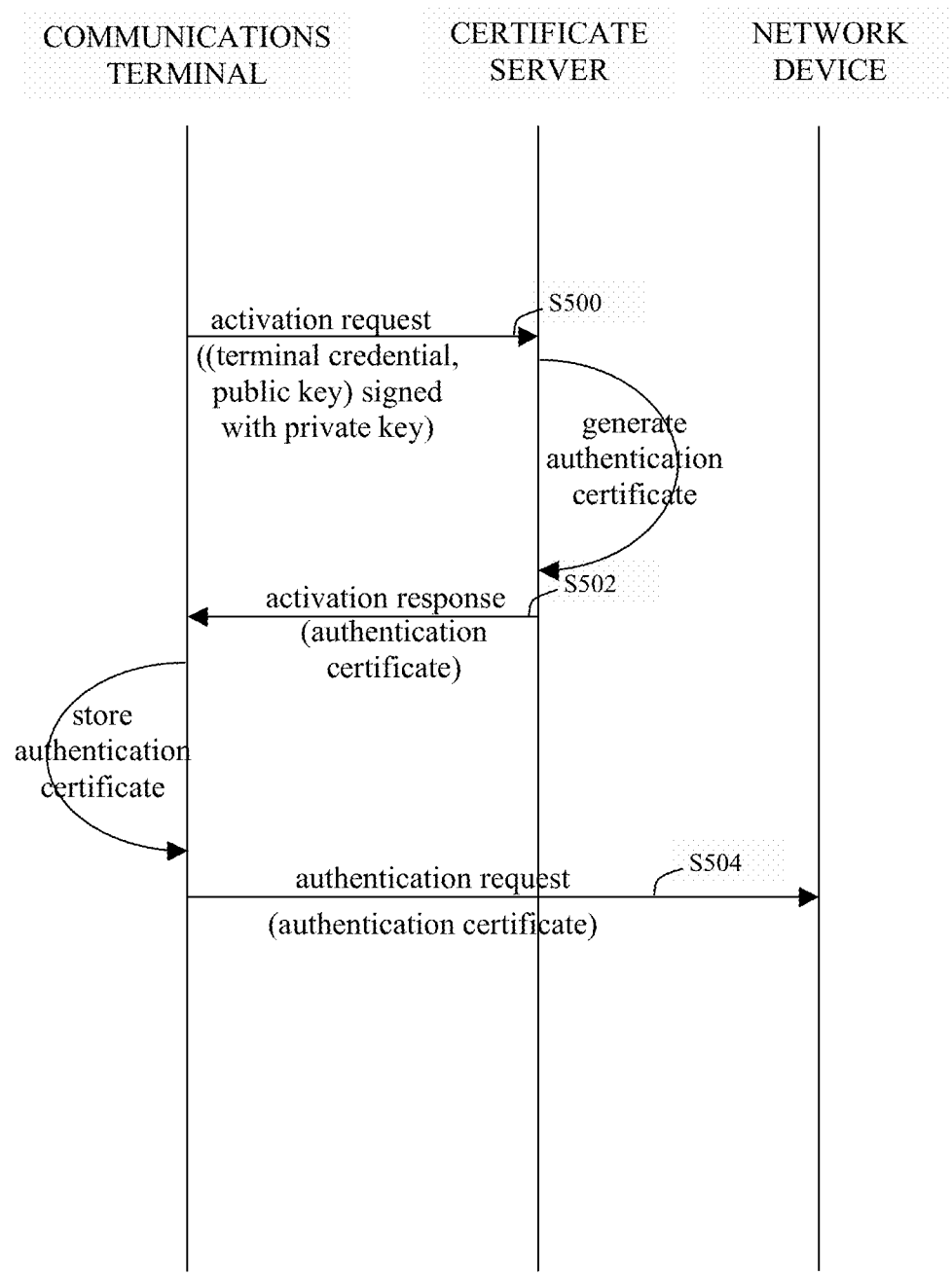
FIG. 5 is a message flow diagram that depicts, by way of overview, the communications terminal authenticating method implemented by the authentication network.

As discussed, the communications terminal 200 implements a method of authenticating the communications terminals 200. A sample embodiment of the communications terminal authenticating method is depicted in FIG. 5. In this embodiment, the communications terminal 200 may be implemented as a pin-pad.

At the outset of the method, the communications terminal 200 generates a terminal activation request from a private cryptographic key (activation code) that is input into or saved in the communications terminal 200, and from at least one terminal credential that is uniquely associated with the communications terminal 200. The terminal activation request includes a public cryptographic key. Preferably, the public cryptographic key and the private cryptographic key comprise an asymmetric cryptographic key pair. The communications terminal 200 transmits the terminal activation request to the certificate server 300, at step S500.

At step S502, the communications terminal 200 receives an activation response from the certificate server 300 in response to the terminal activation request. The activation response comprises a digital authentication certificate that includes the public cryptographic key that was included with the terminal activation request.

Preferably, the certificate server 300 signs the digital authentication certificate using the certificate server's private cryptographic key. The certificate server 300 may determine the validity of the terminal credential, and may generate the digital authentication certificate after successfully validating the terminal credential. Alternately, the certificate server 300 may forward the activation request to a certificate signing authority for generation of the digital authentication certificate (preferably after the certificate server 300 validates the terminal credential), or may generate the digital authentication certificate after forwarding the activation request to another network device for credential validation.

At step S504, the communications terminal 200 uses the digital authentication certificate to authenticate to a network device 500 that is distinct from the certificate server 300. As discussed above, typically the communications terminal 200 uses the digital authentication certificate to authenticate to the network gateway 400. However, the digital authentication certificate may be used to authenticate to any network device that is accessible, directly or indirectly, to the communications terminal 200. Since conventional pin-pad authentication techniques only use the pin-pad serial number to authenticate the pin-pad terminal, this solution offers a significant advantage over the state of the art.

Gateway Authentication Processing—Overview

Figure 6:
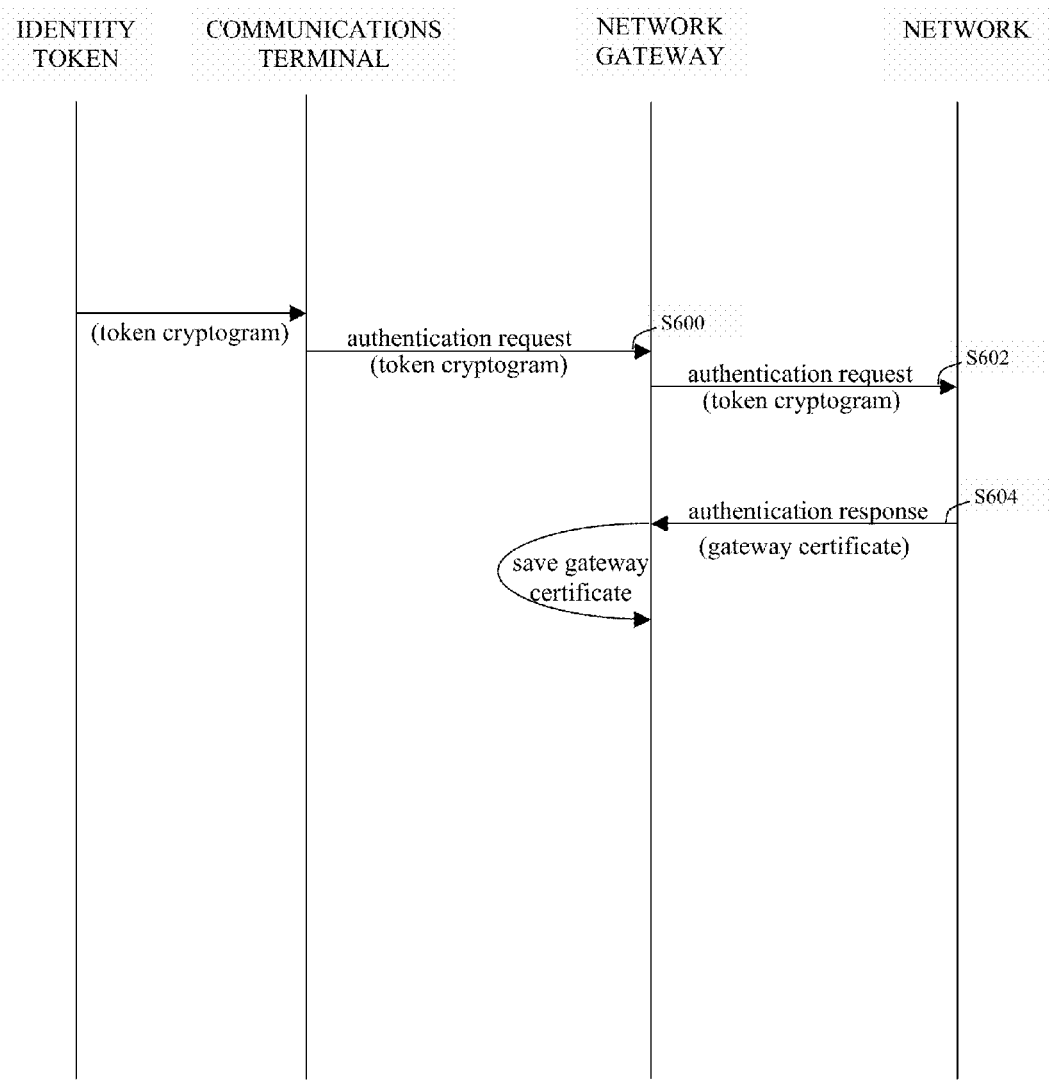
FIG. 6 is a message flow diagram that depicts, by way of overview, the network gateway authenticating method implemented by the authentication network.

As discussed, the network gateway 400 implements a method of network gateway authenticating. A sample embodiment of the network gateway authenticating method is depicted in FIG. 6.

As shown therein, at step S600 the network gateway 400 receives an authentication request from a communications terminal 200. The authentication request includes a token cryptogram that is generated from a cryptographic key that is stored on an identity token 210 that is interfaced with the communications terminal 200. Optionally, the authentication request may include one or more of the administrator credentials.

At step S602, the network gateway 400 transmits the authentication request to a communications network. At step S604, the network gateway 400 receives an authentication response from the communications network in response to a validity of the token cryptogram, and saves the authentication response. The authentication response includes a gateway authentication certificate which the network gateway 400 uses to authenticate to a network device of the communications network.

A network device of the communications network may determine the validity of the token cryptogram (for example, by verifying that the token cryptogram was generated from a cryptographic key stored on the identity token 210), and the authentication response may be transmitted to the network gateway 400 in accordance with the determined validity.

Where the authentication request includes an administrator credential, optionally the network gateway 400 may associate the administrator credential with the gateway authentication certificate. Thereafter, if the network gateway 400 receives an administrator credential from the communications terminal 200, the network gateway 400 may use the received administrator credential and the associated gateway authentication certificate to authenticate to the network device of the communications network.

For example, as discussed above with reference to step S506, the communications terminal 200 may receive a terminal authentication certificate that is configured to facilitate authentication of the communications terminal 200 to the network gateway 400. After step S604, the operator of the communications terminal 200 may transmit a validation request to the network gateway 400 requesting authentication of the communications terminal 200 to a network device of the communications network (e.g. the network device 500 of the second communications network 104). The network gateway 400 may facilitate authentication of the communications terminal 200 to the network device of the communications network via the gateway authentication certificate and the validation request.

As a more detailed example, the validation request may include an administrator credential, and the communications terminal 200 may transmit the validation request to the network gateway 400 after using the terminal authentication certificate to authenticate to the network gateway 400. The network gateway 400 may use the validation request to locate the gateway authentication certificate that is associated with the administrator credential, and then use the located gateway authentication certificate to authenticate to the network device of the communications network.

Transaction Processing—Overview

Figure 7:
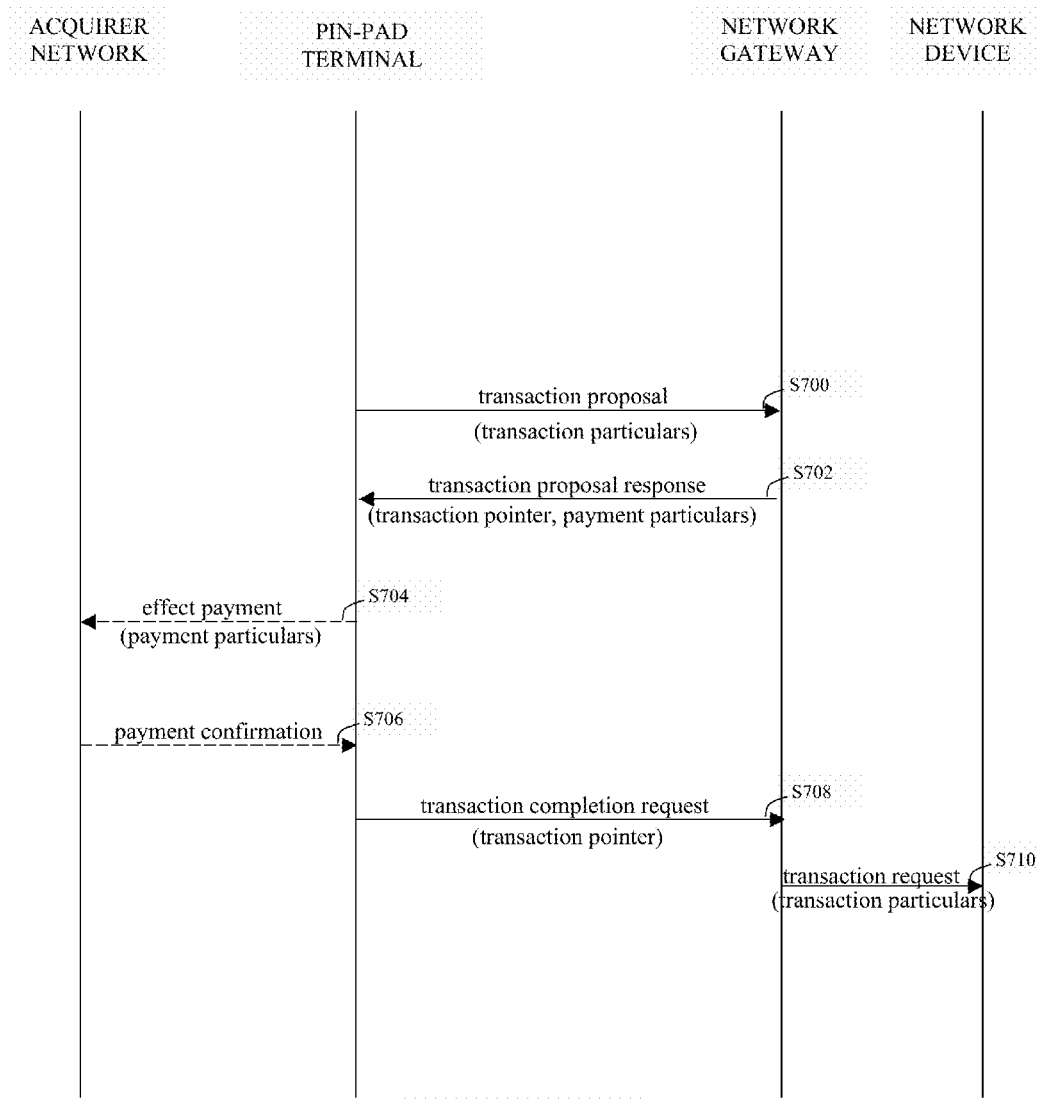
FIG. 7 is a message flow diagram that depicts, by way of overview, the transaction completion method implemented by the authentication network.

As discussed, the network gateway 400 also implements a method for completing a transaction with a network device. A sample embodiment of the transaction completion method is depicted in FIG. 7. In this embodiment, the communications terminal 200 may be implemented as a pin-pad terminal that is communication with an electronic cash register (ECR) 250.

As shown therein, at step S700 the communications terminal 200 transmits a transaction proposal to the network gateway 400 via the first communications network 102. The transaction proposal identifies a transaction that the operator of the communications terminal 200 proposes to engage in with a network device.

The network gateway 400 is configured to authenticate to the network device via a second communications network that comprises the network device. For example, as discussed above, at step S604 the network gateway 400 may receive a gateway authentication certificate which the network gateway 400 can use to authenticate to a network device of the communications network. Accordingly, the transaction proposal may identify a proposed transaction with the network device 500 of the second communications network 104.

At step S702, the communications terminal 200 receives from the network gateway 400 a transaction proposal response in response to the transaction proposal. The transaction proposal response specifies a pointer to the proposed transaction. Preferably, the transaction proposal response also identifies the payment particulars for the proposed transaction.

At step S704, the communications terminal 200 may transmit over the acquirer network 106 payment particulars for effecting payment for the proposed transaction. At step S706, the communications terminal 200 may receive from the acquirer network 106 a payment confirmation in response to the payment particulars. However, these latter two steps are not essential; the operator of the communications terminal 200 may effect payment for the proposed transaction without engaging the acquirer network 106. For example, the operator may pay cash for the proposed transaction, or may use a terminal other than the communications terminal 200 to effect payment for the proposed transaction.

After payment is provided for the proposed transaction, at step S708 the communications terminal 200 initiates completion of the proposed transaction by generating a transaction completion request and transmitting the transaction completion request to the network device via the network gateway 400. The communications terminal 200 generates the transaction completion request from the transaction pointer that was received at step S702. By virtue of the transaction completion request, the communications terminal 200 requests completion of the proposed transaction with the network device.

To complete the transaction, the network gateway 400 may generate a transaction request message from the transaction completion request, and transmit the transaction request message to the network device via the second communications network 104, at step S710. The transaction request message may include the administrator credential and identify the particulars of the proposed transaction.

First Alternate Transaction Processing—Overview

Figure 8A:
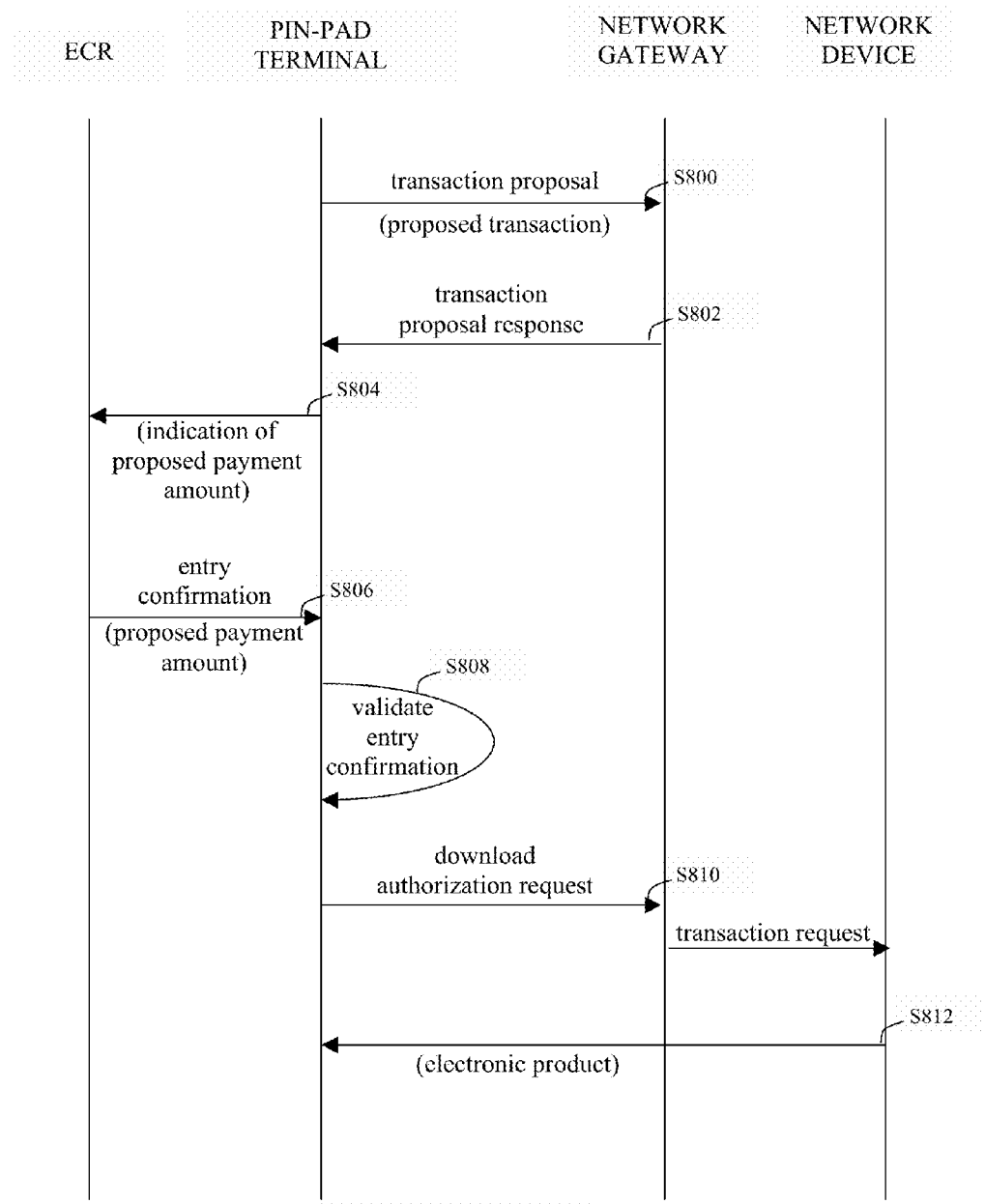
FIG. 8a is a message flow diagram that depicts, by way of overview, a first alternate transaction completion method implemented by the authentication network.

A first alternate embodiment of the transaction completion method, for downloading an electronic product (e.g. a lottery ticket image) to the communications terminal 200, will now be discussed with reference to FIG. 8a.

At step S800 the communications terminal 200 transmits to the network gateway 400 a transaction proposal for an electronic product from the network device 500. At step S802, the communications terminal 200 receives from the network gateway 400 a transaction proposal response generated by the network gateway 400 in response to the transaction proposal. The transaction proposal response includes a transaction pointer that is associated with the electronic product.

At step S804, the ECR 250 receives an indication of a proposed payment amount for the proposed transaction. The communications terminal 200 may provide the ECR 250 with the proposed payment amount indication by rendering an image that identifies the proposed payment amount.

At step S806, the communications terminal 200 receives from the ECR 250 confirmation of entry of the electronic product in the electronic shopping basket maintained by the ECR 250. The communications terminal 200 may receive the confirmation of entry of the electronic product either before or after the consumer pays for the electronic product (or the other items listed in the electronic shopping basket).

At step S808, the communications terminal 200 validates the confirmation of entry of the electronic product from a comparison with the transaction proposal response. At step S810, the communications terminal 200 transmits the transaction pointer to the network device 500 via the network gateway 400 (the network gateway 400 may generate a transaction request message from the transaction pointer, and transmit the transaction request message to the network device 500). The network device 500 transmits or downloads the electronic product to the communications terminal 200 via the network gateway 400, at step S812.

Second Alternate Transaction Processing—Overview

Figure 8B:
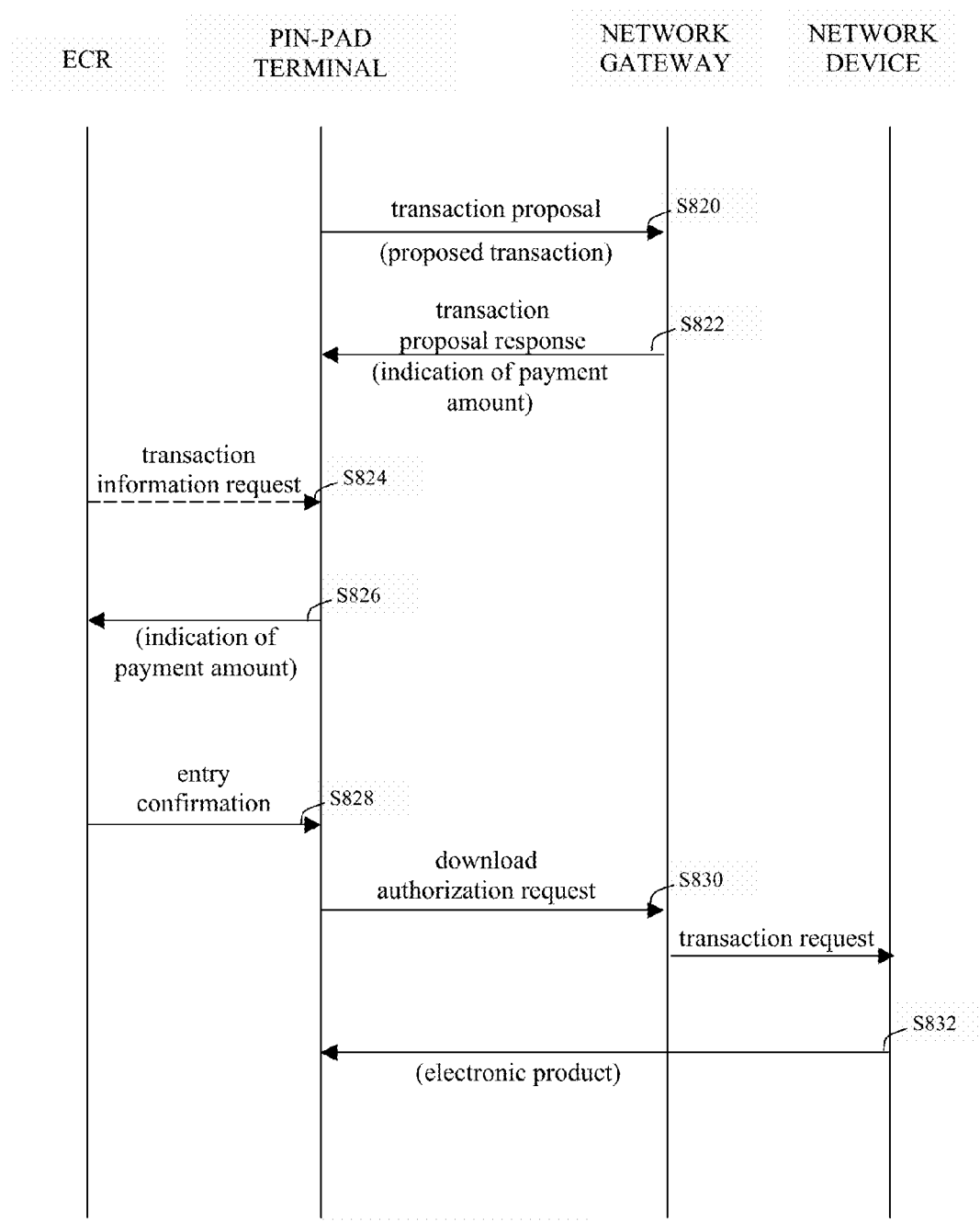
FIG. 8b is a message flow diagram that depicts, by way of overview, a second alternate transaction completion method implemented by the authentication network.

A second alternate embodiment of the transaction completion method, for downloading an electronic product (e.g. a lottery ticket image) to the communications terminal 200, will now be discussed with reference to FIG. 8b. In this second alternate embodiment, the communications terminal 200 is implemented as an integrated (dumb) pin-pad terminal that is communication with the ECR 250.

At step S820 the communications terminal 200 transmits to the network gateway 400 a transaction proposal for an electronic product from the network device 500. At step S822, the communications terminal 200 receives from the network gateway 400 a transaction proposal response generated by the network gateway 400 in response to the transaction proposal. The transaction proposal response includes a transaction pointer associated with the electronic product.

The ECR 250 may optionally issue the communications terminal 200 a transaction information request, at step S824, requesting an indication of the required payment amount for the electronic product. At step S826, the communications terminal 200 electronically directly transmits the payment amount indication to the ECR 250.

At step 828, the communications terminal 200 receives from the ECR 250 confirmation of entry of the electronic product in the electronic shopping basket maintained by the ECR 250. The communications terminal 200 may receive the confirmation of entry of the electronic product either before or after the consumer pays for the electronic product (or the other items listed in the electronic shopping basket).

At step S830, the communications terminal 200 transmits the transaction pointer to the network device 500 via the network gateway 400 (the network gateway 400 may generate a transaction request message from the transaction pointer, and transmit the transaction request message to the network device 500). The network device 500 transmits or downloads the electronic product to the communications terminal 200 via the network gateway 400, at step S832.

Transaction Processing Method—Detailed Discussion

A preferred implementation of the authentication network 100 will now be discussed with reference to FIGS. 9 to 14. In this implementation, the second communications network 104 comprises a wide area network, such as the Internet, and the network device 500 is implemented as a computer (lottery) server that facilitates lottery ticket sales via the second communications network 104. Each communications terminal 200 is configured as an integrated (dumb) or semi-integrated (smart) pin-pad terminal that is connected to a respective ECR 250 and is deployed in a respective checkout lane of the merchant's store. Customers in the merchants' stores use the pin-pad terminals 200 to pay for goods/services that are being offered for sale by the merchant, and to purchase lottery tickets from the lottery server 500.

The operator of the lottery provides each merchant with a smartcard 210 that is configured with the unique administrator credentials (sysID and administrator passcode). The lottery server 500 is in communication with a token database that saves the administrator credentials and public cryptographic key associated with each smartcard 210.

The administrator of the terminal management server 350 provides each merchant with a physical document that specifies the terminal credentials (unique terminal ID and terminal serial number) and activation code for each of the merchant's pin-pad terminals 200. The database of the terminal management server 350 stores the terminal credentials of each pin-pad terminal 200. The memory 214 of each pin-pad terminal 200 is pre-configured with a terminal serial number and with the authentication certificate of the certificate server 300. The administrator of the terminal management server 350 may ensure that each terminal ID, terminal serial number and activation code is uniquely associated with the respective pin-pad terminal 200 by employing any suitable database and/or cryptographic technique known in the art, including generating each terminal ID, terminal serial number and activation code from a pseudo-random number generator or noise generator. Alternately, or additionally, the administrator may confirm that each terminal ID and terminal serial number is unique within the database of the terminal management server 350. Similarly, the administrator may save each activation code in a secure database only after confirming that the administrator has not previously assigned the activation code to a pin-pad terminal 200.

1. Terminal Activation

Figure 9:
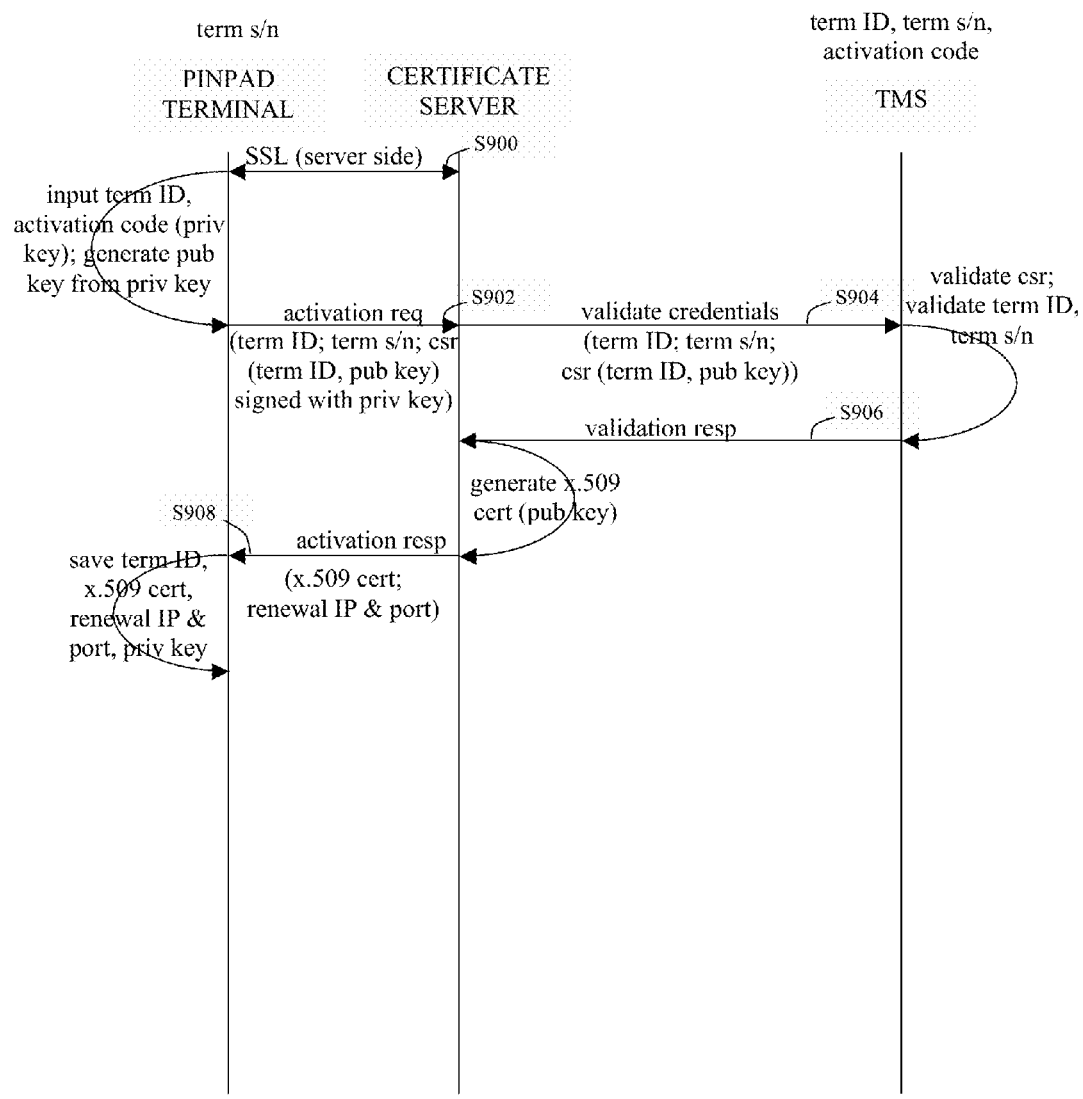
FIG. 9 is a is a detailed message flow diagram that depicts a sample embodiment of the terminal activation method implemented by the authentication network.
Figure 10:
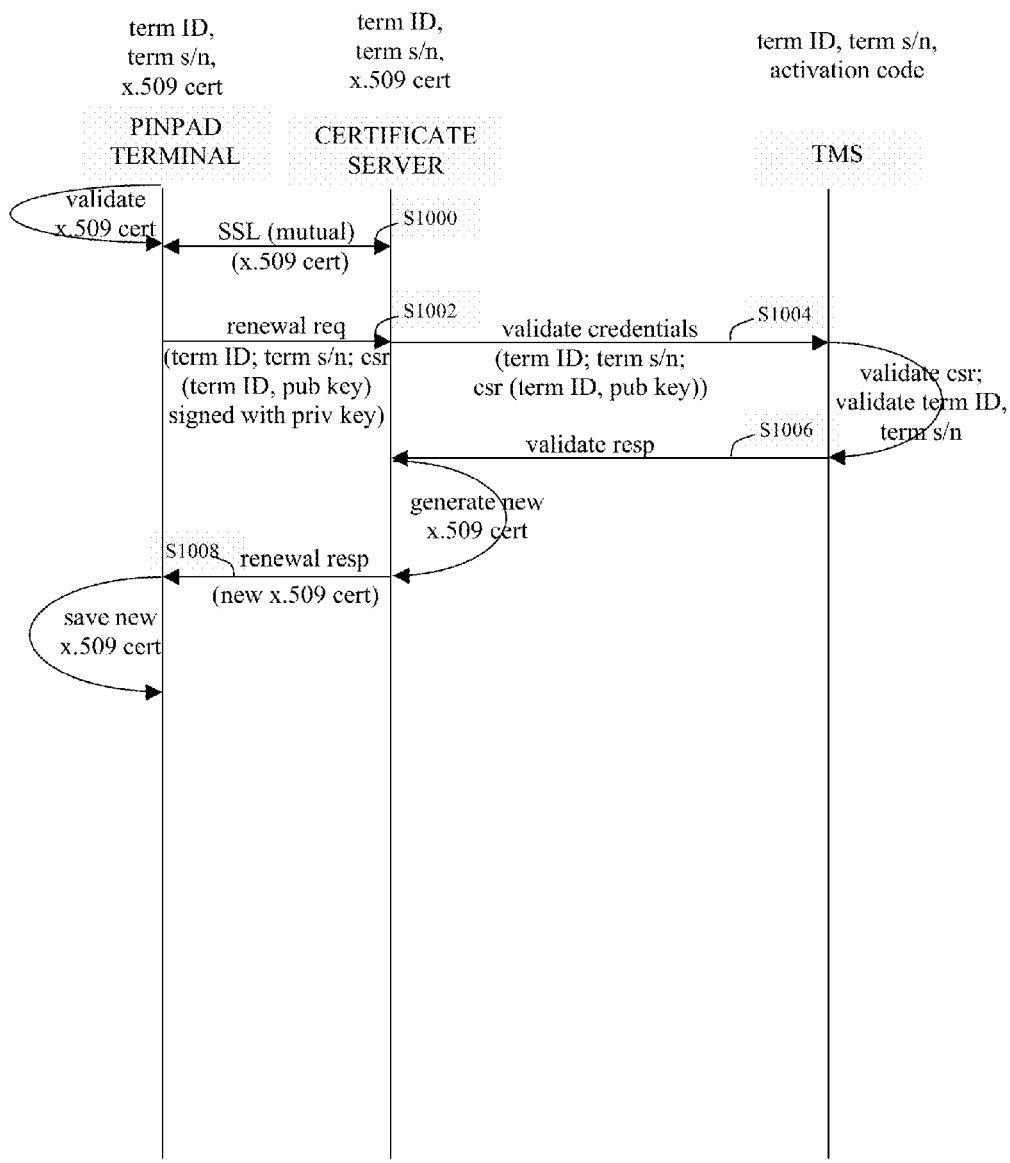
FIG. 10 is a detailed message flow diagram that depicts a sample embodiment of the certificate renewal method implemented by the authentication network.

To allow the merchant to use the pin-pad terminals 200 within the authentication network 100, the merchant executes the terminal activation method, depicted in FIG. 9, to thereby provide each pin-pad terminal 200 with a respective terminal authentication certificate that the pin-pad terminal 200 can use to authenticate to the network gateway 400.

At step S900, the merchant applies power to the pin-pad terminal 200 (by connecting the pin-pad terminal 200 to the associated ECR 250, for example), and the pin-pad terminal 200 establishes an encrypted channel with the certificate server 300. Typically, the pin-pad terminal 200 uses the authentication certificate of the certificate server 300 to establish a server-side SSL connection with the certificate server 300.

The merchant may use the data input device 202 to select the terminal activation method from a menu of available methods. The terminal authentication processor 218 of the pin-pad terminal 200 then prompts the merchant to input the terminal credentials (terminal ID, terminal serial number) and activation code (private cryptographic key) into the pin-pad terminal 200. The merchant manually inputs the requested terminal credentials and activation code into the pin-pad terminal 200 via the data input device 202.

In response, the terminal authentication processor 218 generates a terminal activation request message from the terminal credentials and the activation code. The terminal activation request message includes a public cryptographic key which the terminal authentication processor 218 generates from the activation code. The public cryptographic key and the activation code comprise an asymmetric cryptographic key pair.

Preferably, the terminal activation request comprises a certificate signing request (CSR) that the terminal authentication processor 218 generates from the terminal credentials. More preferably, the certificate signing request includes the terminal ID and the public cryptographic key and is digitally-signed using the activation code. The terminal activation request may also include an encrypted message authentication code (e.g. HMAC) that is generated from the terminal serial number and the certificate signing request.

At step S902, the pin-pad terminal 200 transmits the terminal activation request to the certificate server 300. The certificate server 300 then determines the validity of the terminal activation request. To do so, at step S904 the certificate generator 314 may transmit the terminal activation request to the terminal management server 350, requesting that the terminal management server 350 validate the terminal credentials included in the terminal activation request. In response, the terminal management server 350 may query its database with the terminal credentials to verify that the terminal credentials are associated with a common pin-pad terminal 200 (i.e. the terminal credentials are associated with a legitimate pin-pad terminal 200). The terminal management server 350 may respond to the certificate server 300 with a validation response, at step S906.

The certificate server 300 may also determine the validity of the terminal activation request by verifying the digital signature on the terminal activation request. To do so, the certificate generator 314 uses the public cryptographic key that was included with the certificate signing request to verify that the certificate signing request was signed using the activation code (and, therefore, that the public cryptographic key and the activation code comprise an asymmetric cryptographic key pair).

If the certificate server 300 determines that the terminal activation request is valid, the certificate generator 314 generates an activation response message that includes a terminal authentication certificate that the pin-pad terminal 200 can use to authenticate to the network gateway 400. The certificate generator 314 generates the terminal authentication certificate from the public cryptographic key of the certificate signing request, and signs the terminal authentication certificate with the private cryptographic key assigned to the certificate server 300. Preferably, the terminal authentication certificate is a X.509 digital certificate and, therefore, specifies an expiry date that is a predetermined number of days after the current date. The certificate generator 314 may insert, into the activation response message, the (renewal) network address (e.g. IP address and/or port number) of the certificate server 300 at which the pin-pad terminal 200 can transmit certificate renewal requests. Otherwise, the certificate server 300 generates an activation response message that indicates that the terminal activation request is invalid.

The certificate server 300 transmits the activation response message to the pin-pad terminal 200, in response to the activation request message, at step S908. In response, the terminal authentication processor 218 may verify that the terminal authentication certificate was digitally-signed by the certificate server 300, and then saves the terminal authentication certificate in the memory 214, together with the terminal ID, the activation code, and the renewal network address. Thereafter, the pin-pad terminal 200 may use the terminal authentication certificate to authenticate to the network gateway 400.

2. Terminal Certificate Renewal

Preferably, the pin-pad terminals 200 authenticate to the network gateway 400 whenever customers attempt to use the pin-pad terminals 200 to purchase lottery tickets from the lottery server 500. Preferably, the pin-pad terminals 200 also authenticate to the network gateway 400 in order to set up the network gateway 400 and, optionally, to register the pin-pad terminals 200 with the lottery server 500. Therefore, preferably the pin-pad terminal 200 periodically executes the certificate renewal method, depicted in FIG. 10, to ensure that the terminal authentication certificate remains valid. Unlike the terminal activation method, the gateway setup method, the terminal registration method and the transaction request method described herein, preferably the pin-pad terminals 200 executes the certificate renewal method automatically (i.e. without being invoked by the merchant) and transparently (i.e. without notification to the merchant).

At the outset of the certificate renewal method, the terminal authentication processor 218 determines the expiry date of the terminal authentication certificate. If the expiry date reveals that the terminal authentication certificate has expired, the certificate renewal method terminates and the pin-pad terminal 200 will thereafter not re-attempt to authenticate to or otherwise communicate with the network gateway 400, at least until the merchant re-executes the terminal activation method with a new activation code.

However, if the expiry date of the terminal authentication certificate falls within a predetermined time frame after the current date, at step S1000 the terminal authentication processor 218 establishes an encrypted communications channel with the certificate server 300 using the renewal network address (e.g. IP address and/or port number) specified in the activation response message. Typically, the terminal authentication processor 218 uses the terminal authentication certificate to establish a mutually-authenticated SSL connection with the certificate server 300.

The terminal authentication processor 218 then generates a certificate renewal request message from the terminal credentials and the activation code. Preferably, the certificate renewal request message includes the public cryptographic key and the terminal credentials. More preferably, the certificate renewal request comprises a certificate signing request (CSR) that includes the terminal ID and the public cryptographic key and is digitally-signed using the activation code that was saved in the memory 214.

At step S1002, the pin-pad terminal 200 transmits the certificate renewal request to the certificate server 300 over the encrypted channel. The certificate server 300 then determines the validity of the certificate renewal request. To do so, at step S1004, the certificate generator 314 may transmit the certificate renewal request to the terminal management server 350, requesting that the terminal management server 350 to validate the terminal credentials included in the certificate renewal request. In response, the terminal management server 350 may query its database with the terminal credentials to verify that the terminal credentials are associated with a common pin-pad terminal 200 (i.e. the terminal credentials are associated with a legitimate pin-pad terminal 200).

As will be discussed below, suspicious or fraudulent activity involving the pin-pad terminal 200 may have been reported to the operator of the terminal management server 350. Accordingly, the terminal management server 350 may also query its database with the terminal credentials to verify that the terminal authentication certificate has not been revoked.

If the terminal management server 350 determines that the terminal credentials are associated with a legitimate pin-pad terminal 200, and that the terminal authentication certificate has not been revoked, the terminal management server 350 responds to the certificate server 300 with a validation response, at step S1006, indicating that the terminal credentials were successfully validated. Otherwise, the terminal management server 350 responds to the certificate server 300 with a validation response indicating that validation of the terminal credentials failed.

The certificate server 300 may also determine the validity of the certificate renewal request by verifying the digital signature on the certificate renewal request. To do so, the certificate generator 314 uses the public cryptographic key that was included with the certificate signing request to verify that the certificate signing request was signed using the activation code.

If the certificate server 300 determines that the certificate renewal request (and the terminal credentials included therein) are valid, the certificate generator 314 generates a certificate renewal response message that includes a renewed terminal authentication certificate. The certificate generator 314 generates the renewed terminal authentication certificate from the public cryptographic key of the certificate signing request, and signs the terminal authentication certificate with the private cryptographic key assigned to the certificate server 300. Preferably, the renewed terminal authentication certificate is a X.509 digital certificate and, therefore, specifies an expiry date that is a predetermined number of days after the current date. Otherwise, the certificate server 300 generates a certificate renewal response message that indicates that the certificate renewal request is invalid.

The certificate server 300 transmits the certificate renewal response message to the pin-pad terminal 200, in response to the certificate renewal request, at step S1008. In response, the terminal authentication processor 218 verifies that the renewed terminal authentication certificate was signed by the certificate server 300, and then replaces the terminal authentication certificate in the memory 214 with the renewed terminal authentication certificate. Thereafter, the pin-pad terminal 200 uses the renewed terminal authentication certificate to authenticate to the network gateway 400.

3. Gateway Setup

Figure 11:
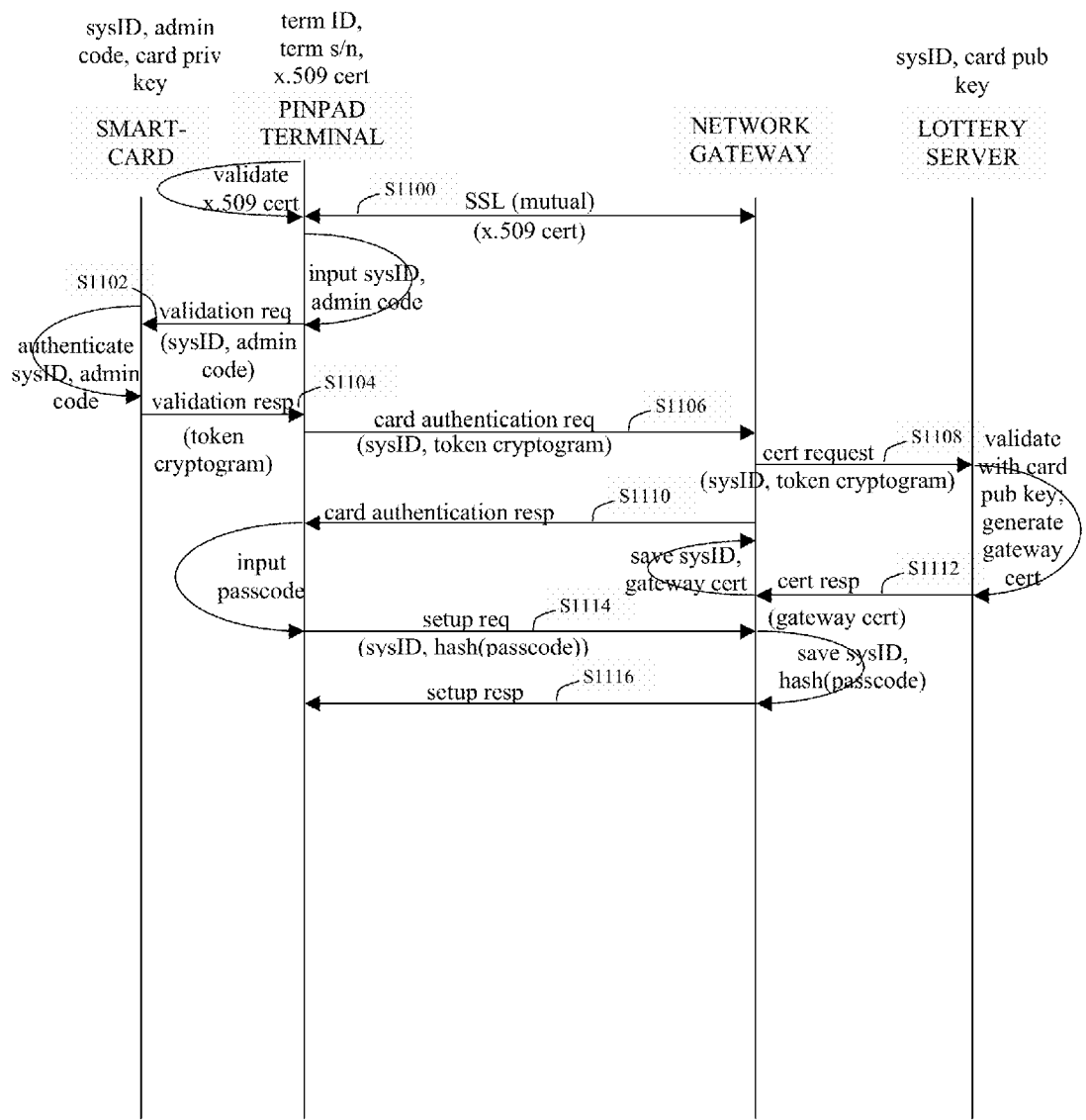
FIG. 11 is a detailed message flow diagram that depicts a sample embodiment of the gateway setup method implemented by the authentication network.

After activating the pin-pad terminal 200, the merchant executes the gateway setup method, depicted in FIG. 11, to thereby provide the network gateway 400 with a gateway authentication certificate that the network gateway 400 can use to authenticate to the lottery server 500 of the second communications network 104. Optionally, the gateway setup method also installs in the network gateway 400 a gateway credential which the pin-pad terminal 200 can use to allow the merchant to access and configure the network gateway 400.

The merchant may use the data input device 202 to select the gateway setup method from the menu of available methods. If the terminal authentication processor 218 determines that the terminal authentication certificate is valid, the terminal authentication processor 218 establishes an encrypted channel with the network gateway 400, at step S1100. Typically, the terminal authentication processor 218 uses the terminal authentication certificate to establish a mutually-authenticated SSL connection with the network gateway 400.

The terminal authentication processor 218 of the pin-pad terminal 200 then prompts the merchant to interface an identity token with the pin-pad terminal 200 and to input one or more administrator credentials (e.g. sysID, administrator passcode) into the pin-pad terminal 200. The merchant interfaces the supplied smartcard 210 with the token interface 209 of the pin-pad terminal 200, and then uses the data input device 202 to input the required administrator credentials into the pin-pad terminal 200. In response, the terminal authentication processor 218 generates a credential validation request message that includes the administrator credential(s). The terminal authentication processor 218 transmits the credential validation request to the smartcard 210, at step S1102.

In response, the smartcard 210 may compare the administrator credentials that were received in the credential validation request with the administrator credentials that are saved in the protected memory of the smartcard 210. If the received administrator credentials match the saved administrator credentials, the smartcard 210 may generate a token cryptogram from the administrator credentials and the private cryptographic key saved in the smartcard 210. Alternately, the smartcard 210 may generate the token cryptogram without comparing the administrator credentials with the saved administrator credentials.

The smartcard 210 then generates a credential validation response that includes the token cryptogram. Otherwise, the smartcard 210 may generate a credential validation response that indicates that the received administrator credentials are invalid. The smartcard 210 transmits the credential validation response to the pin-pad terminal 200, in response to the credential validation request, at step S1104.

If the credential validation response includes a token cryptogram, the terminal authentication processor 218 generates a card authentication request message that includes the administrator credentials and the token cryptogram. The terminal authentication processor 218 then transmits the card authentication request to the network gateway 400 over the encrypted channel, at step S1106. Preferably, the smartcard 210 generates the token cryptogram from the administrator sysID and the token private cryptographic key and, therefore, the card authentication request includes the administrator sysID and the token cryptogram.

The gateway authenticator 414 of the network gateway 400 generates a certificate request message that includes the token cryptogram and associated administrator credential(s), and transmits the certificate request message to a network device (lottery server) 500 of the second communications network, at step S1108. In response, the lottery server uses the administrator credential(s) of the certificate request message to locate the public cryptographic key that is associated with the smartcard 210. The lottery server then validates the token cryptogram of the certificate request message using the located public cryptographic key, thereby verifying that the token cryptogram was generated from the administrator credentials and from the private cryptographic key that is associated with the smartcard 210.

If the lottery server determines that the token cryptogram is valid, the lottery server generates a certificate response message that includes a gateway authentication certificate that the network gateway 400 can use to authenticate to the lottery server. The lottery server signs the gateway authentication certificate with the private cryptographic key assigned to the lottery server, and may also associate the gateway authentication certificate with the administrator credential(s) that were included with the certificate request message. Otherwise, the lottery server generates a certificate response message that indicates that the token cryptogram is invalid. The lottery server transmits the certificate response message to the network gateway 400, in response to the certificate request message, at step S1110.

The gateway authenticator 414 may verify that the gateway authentication certificate was digitally-signed by the lottery server, and then saves the gateway authentication certificate, together with the administrator credentials that were included in the card validation request. Preferably, the gateway authenticator 414 associates the gateway authentication certificate with the administrator sysID. Thereafter, the network gateway 400 can use the gateway authentication certificate to authenticate to the lottery server.

The gateway authenticator 414 then generates a card authentication response, indicative of the validity of the token cryptogram. The gateway authenticator 414 transmits the card validation response to the pin-pad terminal 200, in response to the card authentication request, at step S1112.

Optionally, the terminal authentication processor 218 of the pin-pad terminal 200 may then prompt the merchant to input into the pin-pad terminal 200 a new credential (e.g. a gateway passcode) which the merchant would like to use to access and configure the network gateway 400. The merchant uses the data input device 202 to input the new credential (gateway passcode) into the pin-pad terminal 200. In response, the terminal authentication processor 218 computes a hash code from the gateway passcode, and generates a security setup request message that includes the administrator sysID and hashed gateway passcode. The terminal authentication processor 218 transmits the security setup request to the network gateway 400, at step S1114.

The gateway authenticator 414 validates the security setup request by verifying that the network gateway 400 has already associated the administrator sysID (included in the security setup request message) with a gateway authentication certificate. If the gateway authenticator 414 is able to locate a corresponding gateway authentication certificate, the gateway authenticator 414 associates the hashed gateway passcode with the saved administrator sysID and the associated gateway authentication certificate, and generates a security setup response message, indicative of the validity of the administrator sysID. Otherwise, the gateway authenticator 414 generates a security setup response message that indicates that the security setup request failed.

The gateway authenticator 414 transmits the security setup response message to the pin-pad terminal 200, in response to the security setup request, at step S1116. If the security setup request was successfully validated, the merchant may thereafter use the administrator sysID and associated gateway passcode to access and configure the network gateway 400, as will be explained in the next section.

4. Terminal Validation—Optional

Figure 12:
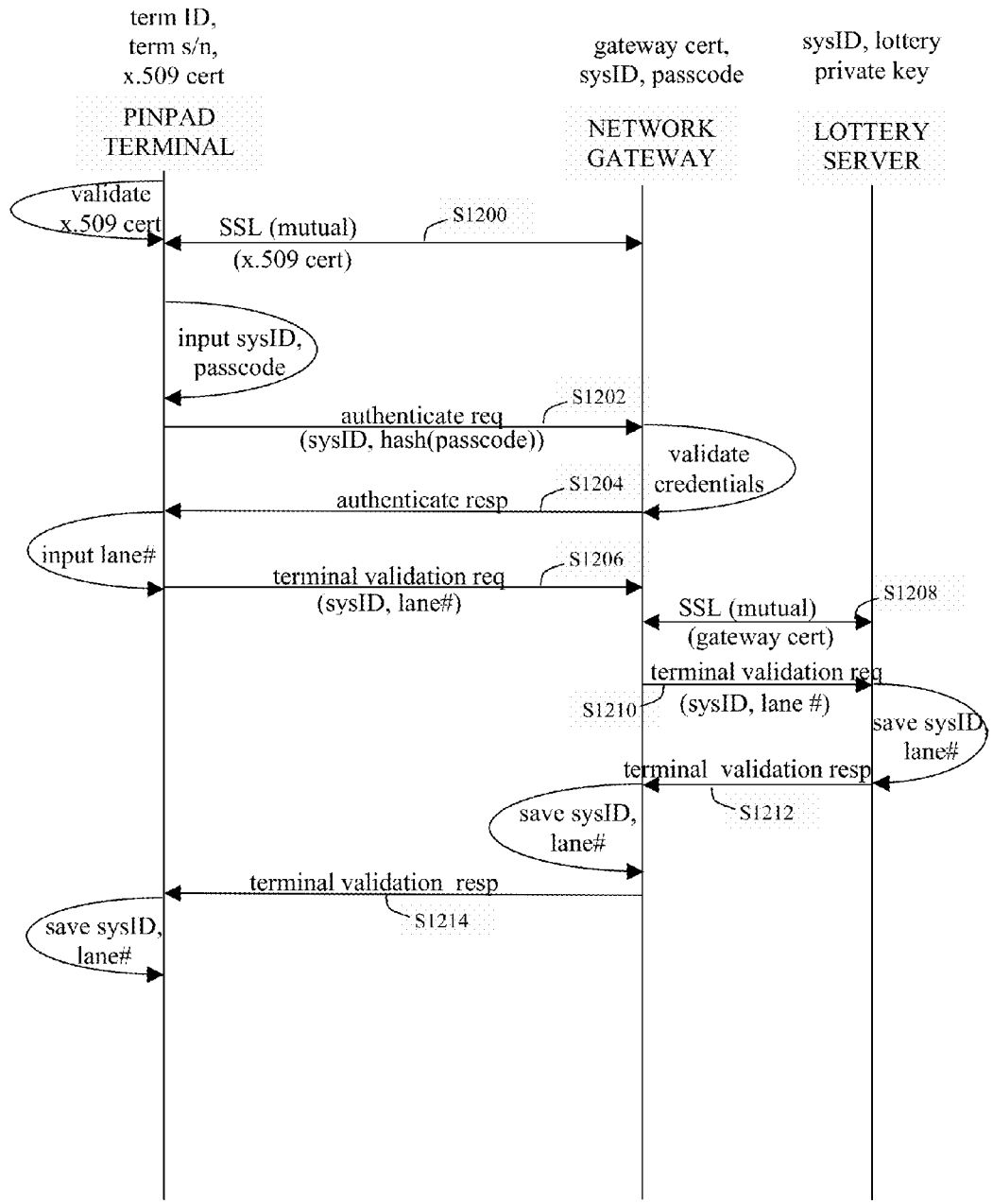
FIG. 12 is a detailed message flow diagram that depicts a sample embodiment of the terminal validation method implemented by the authentication network.

The merchant may optionally execute the terminal validation method, depicted in FIG. 12, which registers the pin-pad terminals 200 with the lottery server. Registering the pin-pad terminals 200 allows the lottery server to subsequently verify the validity of the pin-pad terminal 200.

The merchant may use the data input device 202 to select the terminal validation method from the menu of available methods. If the terminal authentication processor 218 determines that the terminal authentication certificate is valid, the terminal authentication processor 218 establishes an encrypted channel with the network gateway 400, at step S1200. Typically, the terminal authentication processor 218 uses the terminal authentication certificate to establish a mutually-authenticated SSL connection with the network gateway 400.

The terminal authentication processor 218 of the pin-pad terminal 200 then prompts the merchant to an input one or more credentials (e.g. administrator sysID and gateway passcode) into the pin-pad terminal 200. The merchant uses the data input device 202 to input the requested credentials into the pin-pad terminal 200. In response, the terminal authentication processor 218 computes a hash code from the gateway passcode, and generates an administrator authentication request message that includes the administrator sysID and hashed gateway passcode. The terminal authentication processor 218 transmits the administrator authentication request to the network gateway 400 over the encrypted channel, at step S1202.

The gateway authenticator 414 validates the administrator authentication request by verifying that the network gateway 400 has already associated the administrator sysID and hashed gateway passcode with a gateway authentication certificate. If the gateway authenticator 414 is able to locate a corresponding gateway authentication certificate, the gateway authenticator 414 generates an administrator authentication response message, indicative of the validity of the credentials. Otherwise, the gateway authenticator 414 generates an administrator authentication response message that indicates that the administrator authentication request failed.

If the administrator authentication request was successfully validated, the terminal authentication processor 218 prompts the merchant to input into the pin-pad terminal 200 a "local terminal credential" which the merchant would like to use to identify this particular pin-pad terminal 200. As used herein, a "local terminal credential" is a terminal credential that a merchant may use to uniquely identify one of the merchant's pin-pad terminals but which, in contrast to other terminal credentials (e.g. terminal serial numbers), are not necessarily unique amongst all merchants using the network gateway 400.

As discussed above, each pin-pad terminal 200 may be deployed in a respective checkout lane of the merchant's store. Accordingly, the merchant may use the data input device 202 to input the lane number (local terminal credential) into the pin-pad terminal 200. In response, the terminal authentication processor 218 generates a terminal validation request message that includes the administrator sysID and lane number. The terminal authentication processor 218 transmits the terminal validation request to the network gateway 400 over the encrypted channel, at step S1204.

The gateway authenticator 414 uses the administrator sysID (included in the terminal validation request message) to locate the corresponding gateway authentication certificate. If the gateway authenticator 414 is able to locate the corresponding gateway authentication certificate, the gateway authenticator 414 uses the located gateway authentication certificate to establish an encrypted communications channel with the lottery server via the second communications network 104, at step S1208. Typically, the gateway authenticator 414 uses the located gateway authentication certificate to establish a mutually-authenticated SSL connection with the lottery server. Otherwise, the gateway authenticator 414 generates a terminal validation response message that indicates that the terminal validation request failed.

If the gateway authenticator 414 is able to validate the terminal validation request, at step S1210 the gateway authenticator 414 transmits the terminal validation request to the lottery server over the encrypted channel that is established between the network gateway 400 and the lottery server. The lottery server may validate the terminal validation request by verifying that the lottery server has already associated the administrator sysID with the gateway authentication certificate (e.g. after step S1108 of the gateway setup method).

If the lottery server is able to validate the terminal validation request, the lottery server associates the administrator sysID with the specified lane number, and then generates a terminal validation response message, confirming successful validation of the terminal validation request. Otherwise, the lottery server generates a terminal validation response message that indicates that the a terminal validation request failed. The lottery server transmits the terminal validation response message to the network gateway 400, at step S1212.

If the terminal validation request is successful, the gateway authenticator 414 associates the administrator sysID with the specified lane number. The gateway authenticator 414 then transmits the terminal validation response message to the pin-pad terminal 200, in response to the terminal validation request, at step S1214. If the terminal validation request was successfully validated, the pin-pad terminal 200 saves the specified lane number in the memory 214, together with the administrator sysID.

The merchant typically executes the terminal validation method on each of the merchant's pin-pad terminals 200. Each pin-pad terminal 200 may thereafter use the administrator sysID and the pin-pad terminal's local terminal credential to identify itself to the lottery server. As will be demonstrated in the next section, the administrator sysID and associated local terminal credential allow the lottery server to confirm the validity of the pin-pad terminal 200.

5. Transaction Proposal Processing

Figure 13:
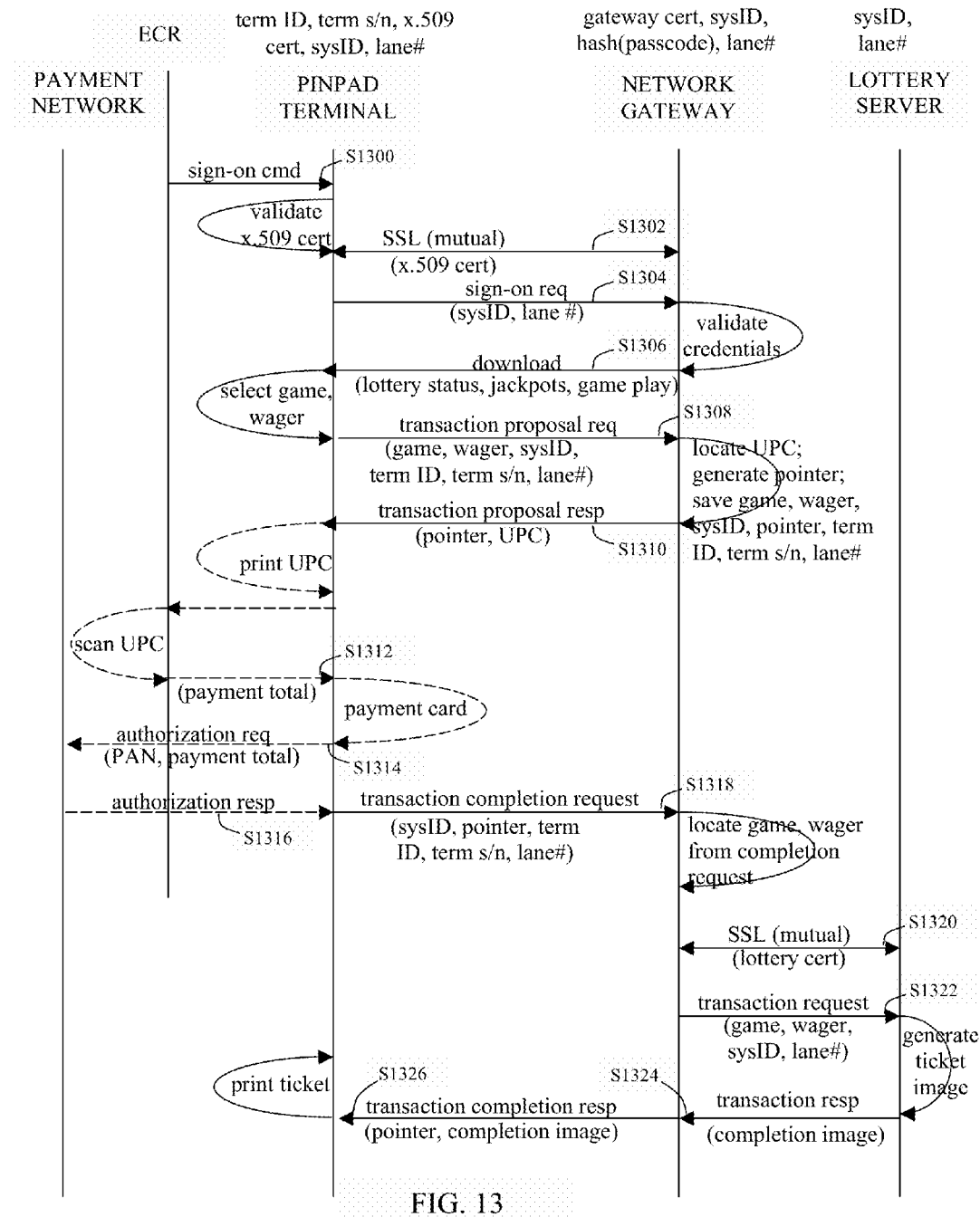
FIG. 13 is a detailed message flow diagram that depicts a sample embodiment of the transaction processing method implemented by the authentication network.

After the merchant has activated the pin-pad terminals 200 and set up the network gateway 400 (and optionally validated the pin-pad terminals 200 to the lottery server), the merchant's customer may execute the transaction processing method, depicted in FIG. 13, to complete an electronic transaction with a network device 500 (e.g. lottery server) of the second communications network 104.

At step S1300, the operator of the ECR 250 transmits a sign-on request message from the ECR 250 to the associated pin-pad terminal 200. After the operator of the ECR 250 signs on to the pin-pad terminal 200, the operator begins inputting into the electronic shopping basket particulars of the merchant's goods/services that the customer is purchasing. As discussed, the operator of the ECR 250 may use the bar code scanner of the ECR 250 to read the bar codes that are affixed to or otherwise associated with the merchant's goods/services being purchased, whereupon the checkout processor of the ECR 250 may extract the UPCs from the bar codes. Alternately, the operator may use the input device of the ECR 250 to manually enter the UPCs, for example where the UPC is not readable by the bar code scanner. The checkout processor then queries the local product code database with the UPC for the particulars (e.g. current price, good/service name) associated with the UPC, and saves the associated particulars in the electronic shopping basket.

While the operator of the ECR 250 is inputting the particulars of the merchant's goods/services into the electronic shopping basket, the terminal authentication processor 218 of the pin-pad terminal 200 determines whether the terminal authentication certificate is valid. If the terminal authentication certificate is valid, the terminal authentication processor 218 establishes an encrypted channel with the network gateway 400, at step S1302. Typically, the terminal authentication processor 218 uses the terminal authentication certificate to authenticate to and to establish a mutually-authenticated SSL connection with the network gateway 400.

The transaction processor 220 then generates a sign-on authentication request message that includes one or more the administrator credentials which the transaction processor 220 reads from the memory 214 of the pin-pad terminal 200. Preferably, the sign-on authentication request message includes the administrator sysID and the local terminal credential of the pin-pad terminal 200 (if assigned). The transaction processor 220 transmits the sign-on authentication request message to the network gateway 400 over the encrypted channel, at step S1304.

The gateway authenticator 414 validates the sign-on authentication request by verifying that the network gateway 400 has associated the specified local terminal credential with the specified administrator sysID. The gateway authenticator 414 then generates a sign-on authentication response message, indicative of the validity of the credentials. The gateway authenticator 414 transmits the sign-on authentication response message to the pin-pad terminal 200, in response to the sign-on authentication request, at step S1306. If the credentials included with the sign-on authentication request are not valid, the sign-on authentication response message indicates that the sign-on authentication request failed.

The network gateway 400 may periodically receive summary transaction (lottery) information from the network device (lottery server) 500 (in response to "ping" messages transmitted by the network gateway 400, for example). The summary transaction (lottery) information typically includes a list of the various transactions (lottery games) that are available and, for each available transaction (lottery game), the deadline for the transaction (e.g. for purchasing lottery tickets and the current jackpot). If the credentials included with the sign-on authentication request are valid, preferably the sign-on authentication response message indicates that the sign-on authentication request was successful, and the gateway authenticator 414 downloads the most recent summary lottery information to the pin-pad terminal 200. Alternately, if the lottery information does not change, the pin-pad terminal 200 may be preconfigured with the lottery information.

If the sign-on authentication response is successful, the transaction processor 220 may prompt the customer to select one of the available transactions (lottery games) and the corresponding price (wager amount). The customer may use the data input device 202 to select the desired transaction (lottery game) from the list of available transactions (lottery games), and to input the desired price (wager amount).

The customer proposes a transaction with the network device (lottery server) 500 by entering the requested information into the pin-pad terminal 200. From one or more administrator credentials and/or one or more terminal credentials, the transaction processor 220 generates a transaction proposal message that specifies the particulars of the proposed transaction. The transaction proposal message may identify the selected transaction (lottery game) and price (wager amount), and preferably also includes one or more administrator credentials and/or one or more terminal credentials which the transaction processor 220 reads from the memory 214 of the pin-pad terminal 200. Preferably, the transaction proposal message includes the administrator sysID, terminal ID, terminal serial number, and lane number. The transaction processor 220 transmits the transaction proposal request to the network gateway 400 over the encrypted connection, at step S1308.

In a previous electronic transaction, the operator of the network device 500 may have detected suspicious or fraudulent activity involving the pin-pad terminal 200, and may have reported said activity to the operator of the terminal management server 350. In response, the operator of the terminal management server 350 may have updated the database of the terminal management server 350 to indicate that the terminal authentication certificate assigned to the pin-pad terminal 200 is revoked. Accordingly, while not shown in FIG. 13, after receiving the transaction proposal request the gateway authenticator 414 may transmit to the terminal management server 350 a certificate status request message that includes the terminal ID and/or terminal serial number and requests that the terminal management server 350 determine whether the terminal authentication certificate that is associated with the specified terminal credentials has been revoked. The terminal management server 350 may respond to the network gateway 400 with a certificate status response message indicating the revocation status of the terminal authentication certificate.

If the terminal authentication certificate has been revoked, the transaction proposal message is not processed further. Otherwise, the gateway authenticator 414 generates a random transaction pointer, and associates the transaction pointer with the transaction proposal message. Preferably, the gateway authenticator 414 generates the transaction pointer from one or more of the selected transaction (lottery game), price (wager amount), administrator sysID, terminal ID, terminal serial number, and lane number and a unique serial number, so that the transaction pointer is uniquely associated with the proposed transaction. Preferably, however, the elements of the transaction proposal message cannot be determined from the transaction pointer.

The gateway authenticator 414 then generates a transaction proposal response message that includes the transaction pointer and provides an indication of the payment particulars (e.g. price, wager amount) for the proposed transaction. Preferably, the indication of payment particulars comprises a payment image that is associated with the payment particulars. More preferably, the payment image comprises a bar code (e.g. universal product code or UPC) which the gateway authenticator 414 generates from the selected transaction (lottery game) and price (wager amount), and the price (wager amount) is explicitly identified (encoded) in the bar code. Alternately, instead of the price (wager amount) being encoded in the bar code, a product code that identifies the transaction type (e.g. the type of lottery ticket purchased (e.g. basic board, basic board+bonus numbers) and the selected lottery game) but does not explicitly identify the price (i.e. implicitly identifies the wager amount based on the type of lottery ticket purchased) may be encoded in the bar code. The gateway authenticator 414 transmits the transaction proposal response message to the pin-pad terminal 200, in response to the transaction proposal, at step S1310.

Upon receipt of the transaction proposal response, the transaction processor 220 saves the transaction pointer in the memory 214, and may render the payment image particulars on the display device 204 of the pin-pad terminal 200. The checkout processor of the ECR 250 may then input the price (wager amount) into the electronic shopping basket of the ECR 250.

If the payment particulars comprise a payment image (e.g. universal product code), the transaction processor 220 may use the printer of the display device 204 to render the payment image, and the operator of the ECR 250 may then use the bar code scanner of the ECR 250 to scan the printed payment image and thereby input the wager amount into the electronic shopping basket. Alternately, the transaction processor 220 may use the LCD panel of the display device 204 to render the payment image, and the operator of the ECR 250 may use the bar code scanner to read the payment image.

If the price (wager amount) is explicitly encoded in the payment image, the checkout processor of the ECR 250 extracts the price (wager amount) from the bar code and saves the price (wager amount) in the electronic shopping basket. Alternately, if the payment image only encodes a product code for the proposed transaction, not the price (wager amount) (i.e. the price (wager amount) is indirectly encoded in the bar code), the checkout processor may extract the product code from the payment image, query the local product code database with the product code for the price associated with the product code, and save the price (wager amount) in the electronic shopping basket.

After the operator of the ECR 250 has finished inputting into the electronic shopping basket the price (wager amount) for the proposed transaction with the network device 500 and the particulars of all the merchant's goods/services that are being purchased by the customer, the operator uses the input device of the ECR to issue to the checkout processor of the ECR 250 a command to close the electronic shopping basket. The checkout processor then calculates the total amount owed for the proposed transaction with the network device 500 and the merchant's goods/services (if any) listed in the electronic shopping basket. The checkout processor may then transmit to the pin-pad terminal 200 an indication of the total payment amount owed, at step S1312.

The customer then provides payment for the proposed transaction and the merchant's goods/services (if any). The customer may provide cash payment for the proposed transaction and the merchant's goods/services (if any), and the operator of the ECR 250 may use the ECR 250 to provide the transaction processor 220 with a successful payment confirmation message. However, since the customer has used the pin-pad terminal 200 to generate the transaction proposal, preferably the transaction processor 220 invokes the payment processor 216, upon receipt of the payment particulars from the ECR 250, to thereby allow the customer to provide electronic payment for the proposed transaction and the merchant's goods/services (if any) via the acquirer network 106.

To provide electronic payment of the total payment amount, the customer may interface the customer's payment card with the contact/contactless token interface 209 of the pin-pad terminal 200 to thereby provide the payment processor 216 with the required payment account information (e.g. credit card number, debit account number). The customer may also use the data input device 202 to provide any required customer credentials (e.g. personal identification number). The payment processor 216 may transmit over the acquirer network 106, at step S1314, an authorization request that includes the indication of the total payment amount and the payment account information. After receiving an authorization response from the acquirer network 106 at step S1316, the payment processor 216 may provide the transaction processor 220 with a successful payment confirmation message confirming that the customer successfully provided payment in the total payment amount.

Upon receiving a successful payment confirmation message, the transaction processor 220, generates a transaction completion request message that requests completion of the proposed transaction with the network device 500, and includes the transaction pointer. Preferably, the transaction completion request message also includes one or more administrator credentials and/or one or more terminal credentials which the transaction processor 220 reads from the memory 214 of the pin-pad terminal 200. More preferably, the transaction completion request message includes the administrator sysID, terminal ID, terminal serial number, and lane number. If the transaction processor 220 does not receive a successful payment confirmation message from the ECR 250 or the payment processor 216 within a predetermined time period, the transaction processor 220 does not generate a transaction completion request message and instead may delete the transaction pointer from the memory 214 to thereby prevent the customer from completing the proposed transaction with the network device 500.

The transaction processor 220 transmits the transaction completion request to the network gateway 400 over the encrypted channel, at step S1318. Since the transaction processor 220 transmits the transaction completion request after receiving the successful payment confirmation message, in effect the transaction completion request is only transmitted after the pin-pad terminal 200 receives confirmation from the ECR 250 of payment for all items that were entered in the electronic shopping basket.

In response to the transaction completion request, the gateway authenticator 414 uses the administrator sysID (included in the transaction completion request) to locate the corresponding gateway authentication certificate, and then uses the located gateway authentication certificate to establish an encrypted communications channel with the network device 500 via the second communications network 104, at step S1320. Typically, the gateway authenticator 414 uses the gateway authentication certificate to establish a mutually-authenticated SSL connection with the network device 500.

The gateway authenticator 414 also uses the transaction completion request to locate the previously-selected transaction (lottery game) and price (wager amount), and generates a transaction request message that specifies the selected transaction (lottery game) and price (wager amount). Since the transaction completion request includes the transaction pointer and one or more terminal credentials that are uniquely associated with the pin-pad terminal 200, in effect the pin-pad terminal 200 has authenticated to the network gateway 400 when the gateway authenticator 414 locates the previously-selected transaction (lottery game). Preferably, the transaction request message also includes one or more administrator credentials and/or one or more terminal credentials from the transaction completion request. More preferably, the transaction request message includes the administrator sysID and lane number. At step S1322, the gateway authenticator 414 transmits the transaction request message to the network device 500 over the encrypted channel that is established between the network gateway 400 and the network device 500.

The network device 500 may validate the transaction request message by verifying that the network device 500 has already associated the administrator sysID and lane number with the gateway authentication certificate (e.g. after step S1210 of the terminal registration method). If the network device 500 is able to validate the transaction request message, the pin-pad terminal 200 has thereby authenticated to the network device 500 (using an administrator credential (sysID) and a terminal credential (lane number)), and preferably the network device 500 generates a transaction response message that includes a transaction completion image that provides confirmation of completion of the proposed transaction. More preferably, the network device 500 randomly generates any/all game numbers/indicia that are required for the selected lottery game, and the transaction completion image comprises a lottery ticket image that depicts the generated game numbers/indicia. Otherwise, the network device 500 generates a transaction response message that indicates that the transaction request could not be validated.

The network device 500 downloads the transaction response message to the network gateway 400, in response to the transaction request message, at step S1324. The gateway authenticator 414 generates a transaction completion response message from the transaction response message. If the transaction request was successfully validated, preferably the transaction completion response message includes the transaction pointer and the transaction completion image (lottery ticket image). The gateway authenticator 414 downloads the transaction completion response message to the pin-pad terminal 200, in response to the transaction completion request, at step S1326.

If the transaction completion request was successfully validated, the transaction processor 220 deletes the transaction proposal response (transaction pointer and the associated UPC) from the memory 214, and prints the transaction completion image (lottery ticket image) that was included with the transaction completion response.

6. First Alternate Transaction Proposal Processing

Figure 14:
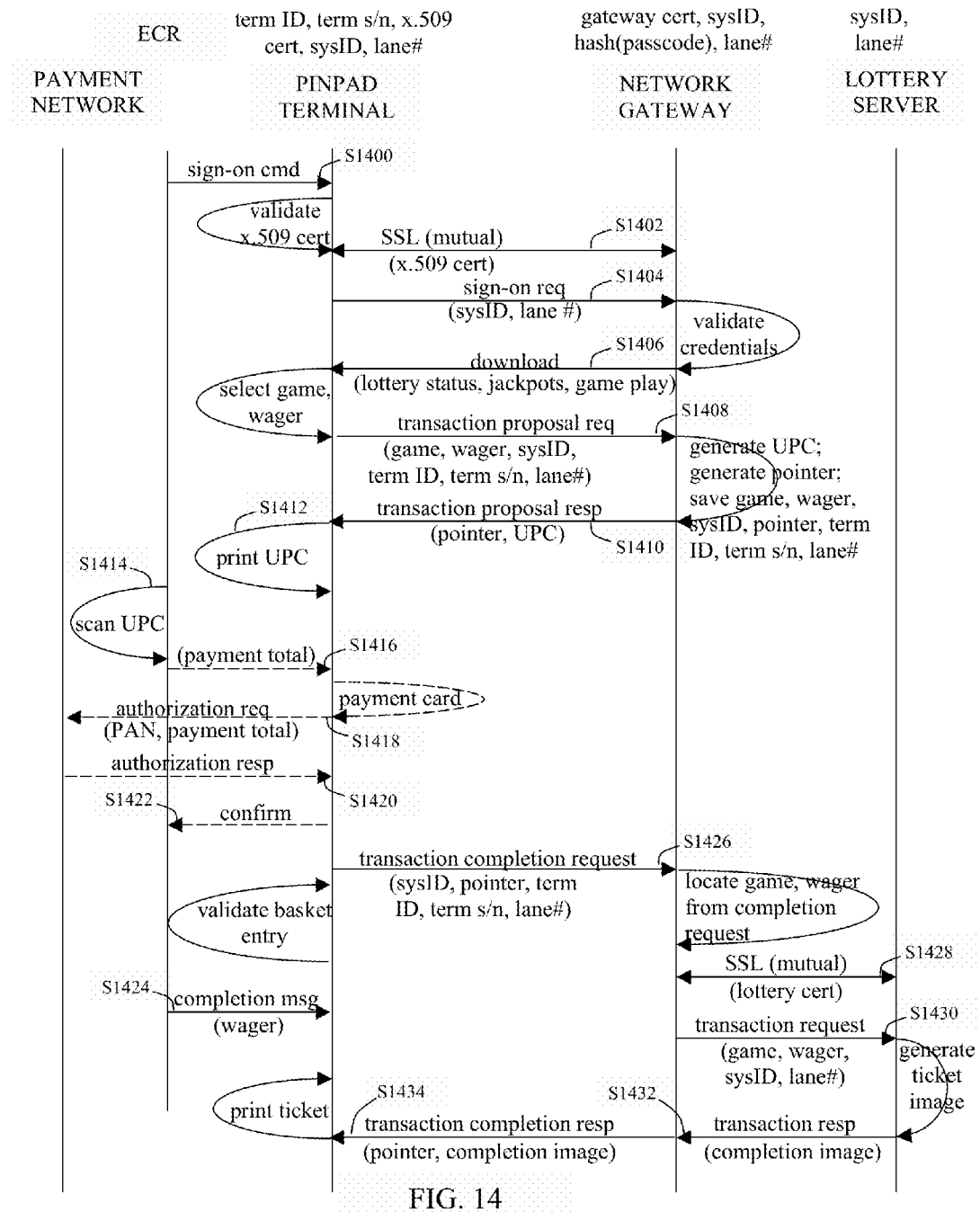
FIG. 14 is a detailed message flow diagram that depicts a first alternate embodiment of the transaction processing method.

In the transaction processing method discussed above with reference to FIG. 13, the customer might be able to initiate a first proposed transaction (e.g. initiate the purchase of a first lottery ticket for a first wager amount), initiate a second proposed transaction (e.g. initiate the purchase of a second lottery ticket for a second wager amount that is greater than the first wager amount) without the knowledge of the operator of the ECR 250, "palm" or conceal the payment image for the second proposed transaction from the operator of the ECR 250, and provide the operator of the ECR 250 with the payment image for the first proposed transaction. Since the ECR 250 (or the operator of the ECR 250) determines the required payment amount for the proposed transaction from the payment image rendered by the pin-pad terminal 200, this tactic would allow the customer to complete the second proposed transaction (and thereby purchase a lottery ticket in the second wager amount) while only paying for the first proposed transaction (i.e. only pay the first (lower) wager amount). An alternate transaction processing method, in which the pin-pad terminal 200 validates the entry in the electronic shopping basket for the lottery ticket prior to initiating completion of the proposed transaction, is depicted in FIG. 14.

Steps S1400 to S1408 correspond to steps S1300 to S1308 and, therefore, will not be discussed in detail. After the transaction processor 220 transmits the transaction proposal request to the network gateway 400 at step S1408, the gateway authenticator 414 generates a random transaction pointer and associates the transaction pointer with the transaction proposal message (if the terminal authentication certificate has not been revoked). As discussed above, preferably the gateway authenticator 414 generates the transaction pointer from one or more of the selected transaction (e.g. lottery game), price (e.g. wager amount), administrator sysID, terminal ID, terminal serial number, and lane number. Preferably, the elements of the transaction proposal message cannot be determined from the transaction pointer.

The gateway authenticator 414 also generates a payment image that identifies the price (wager amount) for the proposed transaction with the network device 500, and generates a transaction proposal response message that includes the transaction pointer and the payment image. Preferably, the payment image comprises a universal product code (UPC) that explicitly identifies the price (wager amount) for the proposed transaction (e.g. ticket purchase for the selected lottery game) with the network device 500 (e.g. lottery server). Alternately (or additionally), the UPC may include a product code for the proposed transaction, which product code identifies the transaction type (e.g. the type of lottery ticket purchased (e.g. basic board, basic board+bonus numbers) and the selected lottery game) but does not explicitly identify the price (i.e. implicitly identifies the wager amount based on the type of lottery ticket purchased).

In addition to the price (wager amount) and/or the product code, preferably the UPC also identifies the entity (e.g. lottery corporation) that will complete the proposed transaction via the network device (lottery server) 500. The gateway authenticator 414 transmits the transaction proposal response message to the pin-pad terminal 200, in response to the transaction proposal, at step S1410.

Upon receipt of the transaction proposal response, the transaction processor 220 saves the transaction pointer in the memory 214, and renders the payment image particulars (UPC) on the display device 204 of the pin-pad terminal 200 at step S1412. At step S1414, the checkout processor of the ECR 250 inputs the price (wager amount) into the electronic shopping basket of the ECR 250. As discussed, the transaction processor 220 may use the printer of the display device 204 to render the UPC, and the operator of the ECR 250 may then use the bar code scanner of the ECR 250 to scan the printed UPC and thereby input the price (wager amount) into the electronic shopping basket.

If the price (wager amount) is explicitly encoded in the UPC, the checkout processor of the ECR 250 extracts the price (wager amount) from the UPC and saves the price (wager amount) in the electronic shopping basket. Alternately, if the product code is encoded in the UPC (i.e. the price (wager amount) is indirectly encoded in the UPC), the checkout processor may extract the product code from the UPC, query the local product code database with the product code for the price, and save the price (wager amount) in the electronic shopping basket.

After the operator of the ECR 250 has finished inputting into the electronic shopping basket the price (wager amount) for the proposed transaction with the network device 500 and the particulars of all the merchant's goods/services that are being purchased by the customer, the operator commands the checkout processor to close the electronic shopping basket and the checkout processor of the ECR 250 calculates the total amount owed for the proposed transaction with the network device 500 and the merchant's goods/services (if any) listed in the electronic shopping basket. The checkout processor then transmits to the pin-pad terminal 200 an indication of the total payment amount owed, at step S1416. As discussed, the total payment amount is at least equal to the price (wager amount) specified in the transaction proposal response (received at step S1410).

Preferably the transaction processor 220 invokes the payment processor 216 upon receipt of the total payment amount indication from the ECR 250, to thereby allow the customer to provide electronic payment for the proposed transaction and for the merchant's goods/services, via the acquirer network 106.

To provide electronic payment of the total payment amount, the customer may interface the customer's payment card with the contact/contactless token interface 209 of the pin-pad terminal 200 to thereby provide the payment processor 216 with the required payment account information (e.g. credit card number, debit account number). The customer may also use the data input device 202 to provide any required customer credentials (e.g. personal identification number). The payment processor 216 may transmit over the acquirer network 106, at step S1418, an authorization request that specifies the total payment amount and the payment account information. After receiving an authorization response from the acquirer network 106 at step S1420, the payment processor 216 may provide the transaction processor 220 with a successful payment confirmation message confirming that the customer successfully provided payment in the total payment amount.

Upon receiving the successful payment confirmation message, at step S1422 the transaction processor 220 may transmit to the ECR 250 a payment confirmation message confirming that the electronic payment was completed. In response, at step S1424 the ECR 250 transmits to the pin-pad terminal 200 a payment completion message that identifies the price (and/or product code) of the proposed transaction with the network device 500 (lottery server). Therefore, in contrast to an embodiment discussed below with reference to FIG. 16, the pin-pad terminal 200 receives from the ECR 250 the extracted indication of the proposed payment amount only after the ECR 250 receives confirmation of payment in an amount at least equal to the proposed payment amount.

Alternately, instead of providing electronic payment via the acquirer network 106, the customer may provide cash payment for the proposed transaction and the merchant's goods/services (if any). In response to the cash payment, at step S1424 the ECR 250 may transmit the payment completion message to the pin-pad terminal 200 without performing steps S1416 to S1422.

Upon receipt of the payment completion message, the transaction processor 220 proceeds to validate the entry in the electronic shopping basket for the proposed transaction by comparing the price (and/or product code) identified in the payment completion message against the price (and/or product code) specified in the UPC of the transaction proposal response (received at step S1410). If the price (product code) identified in the payment completion message does not match the price (product code) specified in the transaction proposal response (i.e. the customer initiated a first proposed transaction, initiated a second proposed transaction, "palmed" or concealed the payment image for the second proposed transaction, and provided the operator of the ECR 250 with the payment image for the first proposed transaction), the transaction processor 220 may print an error message notifying the operator of the ECR 250 of the discrepancy between the two prices (two product codes) for the proposed transaction.

Steps S1426 to S1434 correspond to steps S1318 to S1326 and, therefore, will not be discussed in detail. Therefore, if the price (and/or product code) identified in the payment completion message matches the price (and product code) specified in the transaction proposal response (i.e. the payment completion message was successfully validated), the transaction processor 220 generates a transaction completion request message (i.e. a download authorization request) that requests completion of the proposed transaction (e.g. lottery ticket image) with the network device 500 (and includes the transaction pointer), and transmits the transaction completion request to the network gateway 400 over the encrypted channel at step S1426. In response, the gateway authenticator 414 establishes an encrypted communications channel with the lottery server 500 via the second communications network 104 at step S1428, generates a transaction request message that specifies the selected lottery game and price (wager amount), and transmits the transaction request message to the network device 500 at step S1430.

After validating the transaction request message, the network device 500 generates a transaction response message that includes a transaction completion image that provides confirmation of completion of the proposed transaction (e.g. a lottery ticket image that depicts the generated game numbers/indicia), and downloads the transaction response message to the network gateway 400 at step S1432. The gateway authenticator 414 generates a transaction completion response message that preferably includes the transaction pointer and the transaction completion image, and downloads the transaction completion response message to the pin-pad terminal 200 in response to the transaction completion request at step S1434. The transaction processor 220 then deletes the transaction proposal response (transaction pointer and the associated UPC) from the memory 214, and prints the transaction completion image (lottery ticket image) that was included with the transaction completion response.

7. Second Alternate Transaction Proposal Processing

Figure 15:
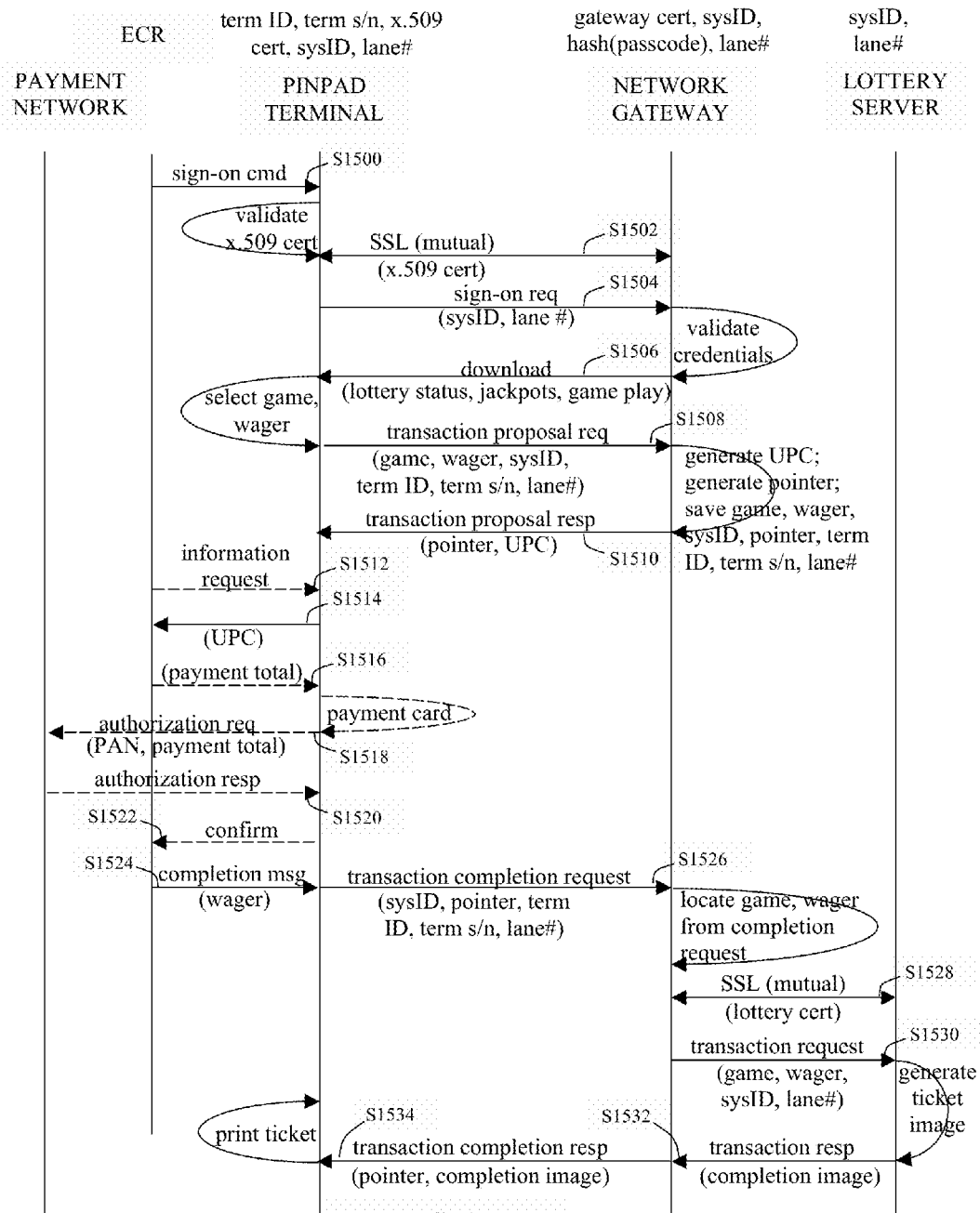
FIG. 15 is a detailed message flow diagram that depicts a second alternate embodiment of the transaction processing method.

In the transaction processing method discussed above with reference to FIG. 14, the pin-pad terminal 200 renders the payment image (UPC), and the operator of the ECR 250 inputs the price of the transaction into the ECR 250 by scanning the rendered payment image with a bar code scanner. An alternate transaction processing method, in which the pin-pad terminal 200 electronically transmits the UPC directly to the ECR 250 without rendering a payment image, is depicted in FIG. 15.

Steps S1500 to S1510 correspond to steps S1400 to S1410 and, therefore, will not be discussed in detail. At step S1510, the gateway authenticator 414 transmits the transaction proposal response message to the pin-pad terminal 200, in response to the transaction proposal.

Upon receipt of the transaction proposal response, the transaction processor 220 saves the transaction pointer and the UPC in the memory 214. However, instead of the transaction processor 220 rendering the UPC on the display device 204 of the pin-pad terminal 200, at step S1512 the checkout processor of the ECR 250 may electronically transmit to the pin-pad terminal 200 a transaction information request, via the connection between the ECR 250 and the pin-pad terminal 200, requesting an indication of the price (wager amount) for the proposed transaction.

If the pin-pad terminal 200 is an integrated ("dumb") POS terminal, and the pin-pad terminal 200 successfully received the UPC from the network gateway 400 at step S1510, the transaction processor 220 transmits the UPC to the ECR 250 at step S1514, via the connection between the ECR 250 and the pin-pad terminal 200, in response to the transaction information request. Alternately, if the pin-pad terminal 200 is a semi-integrated ("smart") pin-pad terminal and the pin-pad terminal 200 successfully received the UPC from the network gateway 400 at step S1510, at step S1514 the transaction processor 220 may electronically transmit the UPC to the ECR 250 in response to the transaction proposal response, via the connection between the ECR 250 and the pin-pad terminal, without waiting for a transaction information request from the ECR 250.

Independently of whether the pin-pad terminal 200 is an integrated ("dumb") POS terminal or a semi-integrated ("smart") pin-pad terminal, if the pin-pad terminal 200 did not receive a UPC at step S1510 (i.e. the customer did not initiate a transaction with the lottery server 500 at step S1508, or the network gateway 400 failed to successfully transmit the transaction proposal response message to the pin-pad terminal 200 at step S1510), the transaction processor 220 transmits a null UPC to the ECR 250 at step S1514.

If the price (wager amount) is explicitly encoded in the UPC, the checkout processor of the ECR 250 extracts the price (wager amount) from the UPC and saves the price (wager amount) in the electronic shopping basket. Alternately, if the product code is encoded in the UPC (i.e. the price (wager amount) is indirectly encoded in the UPC), the checkout processor may extract the product code from the UPC, query the local product code database with the product code for the price, and save the price (wager amount) in the electronic shopping basket.

After the price (wager amount) for the proposed transaction with the network device 500 and the particulars of all the merchant's goods/services that are being purchased by the customer (if any) have been input into the electronic shopping basket, the operator of the ECR 250 commands the checkout processor to close the electronic shopping basket and the checkout processor of the ECR 250 calculates the total amount owed for the proposed transaction with the network device 500 and the merchant's goods/services (if any) listed in the electronic shopping basket.

If the customer intended to provide electronic payment for the proposed transaction and the merchant's goods/services (if any), the ECR 250 may transmit to the pin-pad terminal 200 an indication of the total payment amount owed, at step S1516. As discussed, the total payment amount is at least equal to the wager amount specified in the transaction proposal response (received at step S1510).

Preferably the transaction processor 220 invokes the payment processor 216 upon receipt of the total payment amount indication from the ECR 250, to thereby allow the customer to provide electronic payment for the proposed transaction and the merchant's goods/services via the acquirer network 106.

To provide electronic payment of the total payment amount, the customer may interface the customer's payment card with the contact/contactless token interface 209 of the pin-pad terminal 200 to thereby provide the payment processor 216 with the required payment account information (e.g. credit card number, debit account number). The customer may also use the data input device 202 to provide any required customer credentials (e.g. personal identification number). The payment processor 216 may transmit over the acquirer network 106, at step S1518, an authorization request that specifies the total payment amount and the payment account information. After receiving an authorization response from the acquirer network 106 at step S1520, the payment processor 216 may provide the transaction processor 220 with a successful payment confirmation message confirming that the customer successfully provided payment in the total payment amount.

Upon receiving the successful payment confirmation message, at step S1522 the transaction processor 220 may transmit to the ECR 250 a payment confirmation message confirming that the electronic payment was completed. If the ECR 250 received a non-null UPC from the pin-pad terminal 200 at step S1514, at step S1524, the ECR 250 may transmit to the pin-pad terminal 200 a payment completion message that identifies the wager amount (and/or product code) of the proposed transaction. Therefore, in contrast to an embodiment discussed below with reference to FIG. 17, the pin-pad terminal 200 receives from the ECR 250 the wager amount for the proposed transaction only after the ECR 250 receives confirmation of payment for all items entered in the electronic shopping basket.

Alternately, instead of providing electronic payment via the acquirer network 106, the customer may provide cash payment for the proposed transaction and the merchant's goods/services (if any). In response to the cash payment, at step S1524 the ECR 250 may transmit the payment completion message to the pin-pad terminal 200 without performing steps S1516 to S1522 (if the ECR 250 received a non-null UPC from the pin-pad terminal 200 at step S1514).

Upon receipt of the payment completion message, the transaction processor 220 may optionally proceed to validate the entry in the electronic shopping basket for the proposed transaction by comparing the price (and/or product code) identified in the payment completion message against the price (and/or product code) specified in the UPC of the transaction proposal response (received at step S1510). If the price (and/or product code) identified in the payment completion message does not match the price (and/or product code) specified in the transaction proposal response, the transaction processor 220 may print an error message notifying the operator of the ECR 250 of the discrepancy between the two price amounts (two product codes) for the proposed transaction.

Steps S1526 to S1534 correspond to steps S1426 to S1434 and, therefore, will not be discussed in detail.

8. Third Alternate Transaction Proposal Processing

In the transaction processing method discussed above with reference to FIG. 14, the transaction completion image (lottery ticket image) is downloaded to the pin-pad terminal 200 (step S1434) only after the electronic shopping basket of the ECR 250 has closed, the checkout processor of the ECR 250 has calculated the total payment amount owed for the proposed transaction with the network device 500 (lottery server) and the merchant's goods/services (if any) listed in the electronic shopping basket (step S1416), and the network gateway 400 has received a transaction completion request (step S1426) from the pin-pad terminal 200 confirming that that the customer has paid for the proposed transaction with the network device 500 (lottery server).

Figure 16:
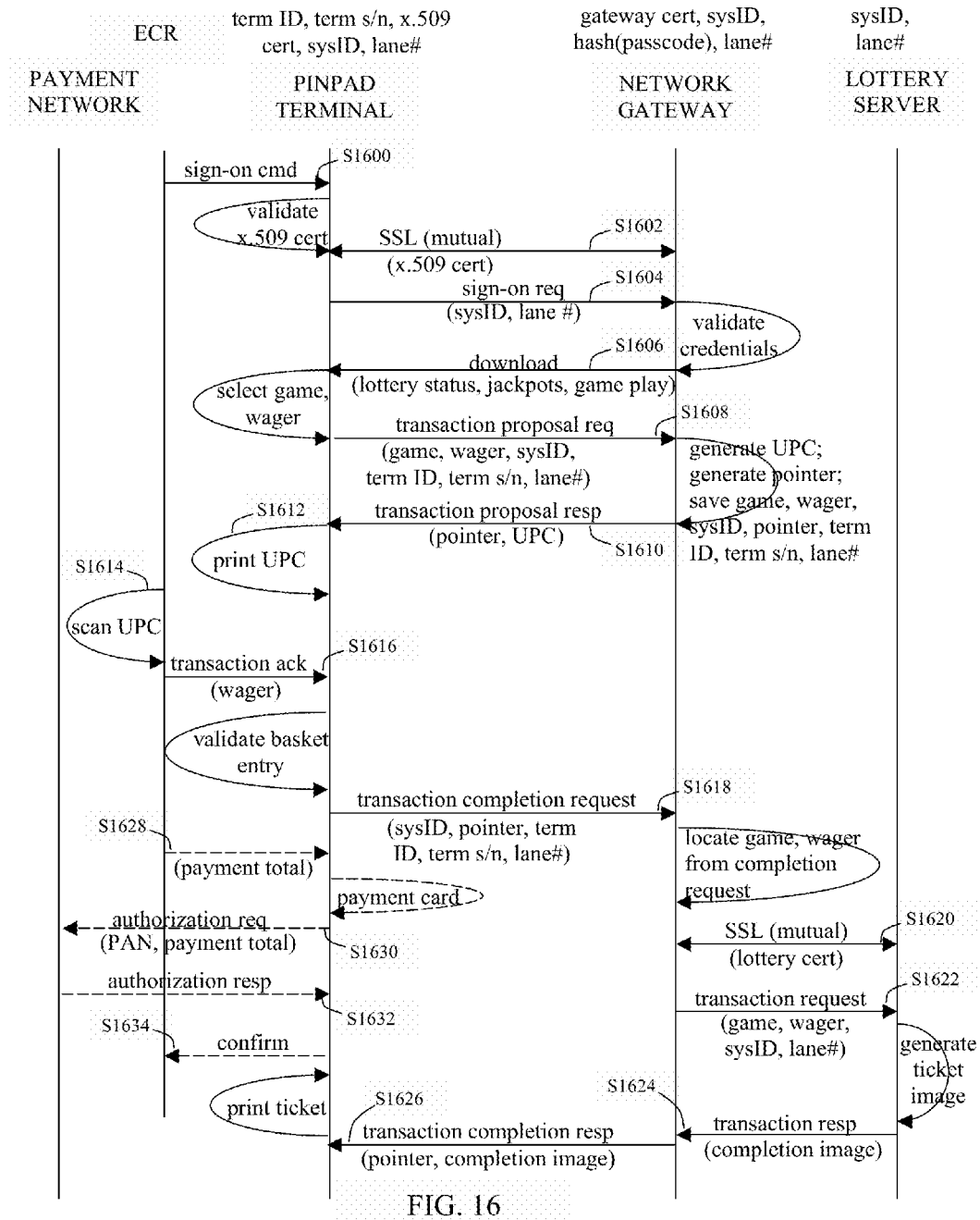
FIG. 16 is a detailed message flow diagram that depicts a third alternate embodiment of the transaction processing method.

An alternate transaction processing method, in which the transaction completion image (lottery ticket image) is downloaded to the pin-pad terminal 200 while the electronic shopping basket of the ECR 250 is open, and before the checkout processor has calculated the total payment amount owed and the network gateway 400 has received confirmation that that the customer has paid for the proposed transaction with the network device 500 (lottery server), is depicted in FIG. 16.

Steps S1600 to S1614 correspond to steps S1400 to S1414 and, therefore, will not be discussed in detail. At step S1614, the checkout processor of the ECR 250 inputs into the electronic shopping basket the price (wager amount) of the proposed transaction with the network device 500 (lottery server). As discussed, the transaction processor 220 may use the printer of the display device 204 to render the UPC, and the operator of the ECR 250 may then use the bar code scanner of the ECR 250 to scan the printed UPC and thereby input the price (wager amount) into the electronic shopping basket.

After the operator of the ECR 250 has finished inputting into the electronic shopping basket the price (wager amount) for the proposed transaction with the network device 500 (lottery server), and while the electronic shopping basket is still open (i.e. without waiting for the electronic shopping basket to close), at step S1616 the checkout processor of the ECR 250 transmits to the pin-pad terminal 200 a transaction acknowledgement message that identifies the price (and/or product code) of the proposed transaction. Therefore, in contrast to the embodiment discussed above with reference to FIG. 14, the pin-pad terminal 200 receives from the ECR 250 the extracted indication of the proposed payment amount before the ECR 250 receives confirmation of payment in an amount at least equal to the proposed payment amount.

Upon receipt of the transaction acknowledgement message, the transaction processor 220 proceeds to validate the entry in the electronic shopping basket for the proposed transaction by comparing the price (and/or product code) identified in the transaction acknowledgement message against the price (and/or product code) specified in the UPC of the transaction proposal response (received at step S1610). If the price (product code) identified in the transaction acknowledgement message does not match the price (product code) specified in the transaction proposal response (i.e. the customer initiated a first proposed transaction, initiated a second proposed transaction, "palmed" or concealed the payment image for the second proposed transaction, and provided the operator of the ECR 250 with the payment image for the first proposed transaction), the transaction processor 220 may print an error message notifying the operator of the ECR 250 of the discrepancy between the two prices (two product codes) for the proposed transaction.

Steps S1618 to S1626 correspond to steps S1318 to S1326 and, therefore, will not be discussed in detail. Therefore, if the price (product code) identified in the transaction acknowledgement message matches the price (product code) specified in the transaction proposal response (i.e. the transaction acknowledgement message was successfully validated), the transaction processor 220 generates a transaction completion request message (i.e. a download authorization request) that requests completion of the proposed transaction (e.g. lottery ticket image) with the network device 500 (and includes the transaction pointer), and transmits the transaction completion request to the network gateway 400 over the encrypted channel at step S1618. In response, the gateway authenticator 414 establishes an encrypted communications channel with the lottery server 500 via the second communications network 104 at step S1620, generates a transaction request message that specifies the selected lottery game and price (wager amount), and transmits the transaction request message to the network device 500 at step S1622.

After validating the transaction request message, the network device 500 generates a transaction response message that includes a transaction completion image that provides confirmation of completion of the proposed transaction (e.g. a lottery ticket image that depicts the generated game numbers/indicia), and downloads the transaction response message to the network gateway 400 at step S1624. The gateway authenticator 414 generates a transaction completion response message that preferably includes the transaction pointer and the transaction completion image, and downloads the transaction completion response message to the pin-pad terminal 200 in response to the transaction completion request at step S1626. Preferably, the transaction processor 220 then deletes the transaction proposal response (transaction pointer and the associated UPC) from the memory 214, and prints the transaction completion image (lottery ticket image) that was included with the transaction completion response.

After the checkout processor of the ECR 250 transmits to the pin-pad terminal 200 the transaction acknowledgement message for the proposed transaction with the network device 500 (step S1616) and the operator of the ECR 250 finishes inputting into the electronic shopping basket the particulars of all the merchant's goods/services that are being purchased by the customer, the operator commands the checkout processor to close the electronic shopping basket and the checkout processor calculates the total amount owed for the proposed transaction with the network device 500 and the merchant's goods/services (if any) listed in the electronic shopping basket.

The checkout processor may then transmit to the pin-pad terminal 200 an indication of the total payment amount owed, at step S1628. As above, the total payment amount is at least equal to the price (wager amount) specified in the transaction proposal response (received at step S1610). However, in contrast to the embodiment discussed above with reference to FIG. 14, the pin-pad terminal 200 transmits the transaction pointer before receiving from the ECR 250 confirmation of payment for any items entered in the electronic shopping basket.

Upon receipt of the total payment amount indication, preferably the transaction processor 220 of the pin-pad terminal 200 invokes the payment processor 216 to thereby allow the customer to provide electronic payment for the proposed transaction and for the merchant's goods/services, via the acquirer network 106.

Steps S1630 to S1634 correspond to steps S1418 to 1422 and, therefore, will not be described in detail. After the customer interfaces the customer's payment card with the contact/contactless token interface 209 of the pin-pad terminal 200 and provides any required customer credentials (e.g. personal identification number), the payment processor 216 may transmit over the acquirer network 106, at step S1630, an authorization request that specifies the total payment amount and the payment account information. The payment processor 216 receives an authorization response from the acquirer network 106 at step S1632, and may provide the transaction processor 220 with a successful payment confirmation message confirming that the customer successfully provided payment in the total payment amount.

Upon receiving the successful payment confirmation message, at step S1634 the transaction processor 220 may transmit to the ECR 250 a payment confirmation message confirming that the customer successfully provided payment in the total payment amount. In response, the ECR 250 may transmit a print authorization message to the pin-pad terminal 200 (unless the transaction processor 220 printed the transaction completion image in response to the transaction completion response message at step S1626), and the transaction processor 220 may then delete the transaction proposal response (transaction pointer and the associated UPC) from the memory 214 and print the transaction completion image (lottery ticket image) that was included with the transaction completion response.

Alternately, instead of providing electronic payment via the acquirer network 106, the customer may provide cash payment for the proposed transaction and the merchant's goods/services (if any). In response to the cash payment, the ECR 250 may transmit the print authorization message to the pin-pad terminal 200 without performing steps S1628 to S1634.

Steps S1616 to S1626 may be performed in parallel with steps S1628 to S1634. Therefore, the transaction completion image can be downloaded to the pin-pad terminal 200 while the electronic shopping basket is still open, or at least before the ECR 250 receives the payment confirmation message from the pin-pad terminal 200 or the customer provides cash payment for the total payment amount. As a result, the time required to complete the transaction processing method of FIG. 16 may be less than that required by the embodiment of FIG. 14.

9. Fourth Alternate Transaction Proposal Processing

In the transaction processing method discussed above with reference to FIG. 15, the transaction completion image (lottery ticket image) is downloaded to the pin-pad terminal 200 (step S1534) only after the electronic shopping basket of the ECR 250 has closed, the checkout processor of the ECR 250 has calculated the total payment amount owed for the proposed transaction with the network device 500 (lottery server) and the merchant's goods/services (if any) listed in the electronic shopping basket (step S1516), and the network gateway 400 has received a transaction completion request (step S1526) from the pin-pad terminal 200 confirming that that the customer has paid for the proposed transaction with the network device 500 (lottery server).

Figure 17:
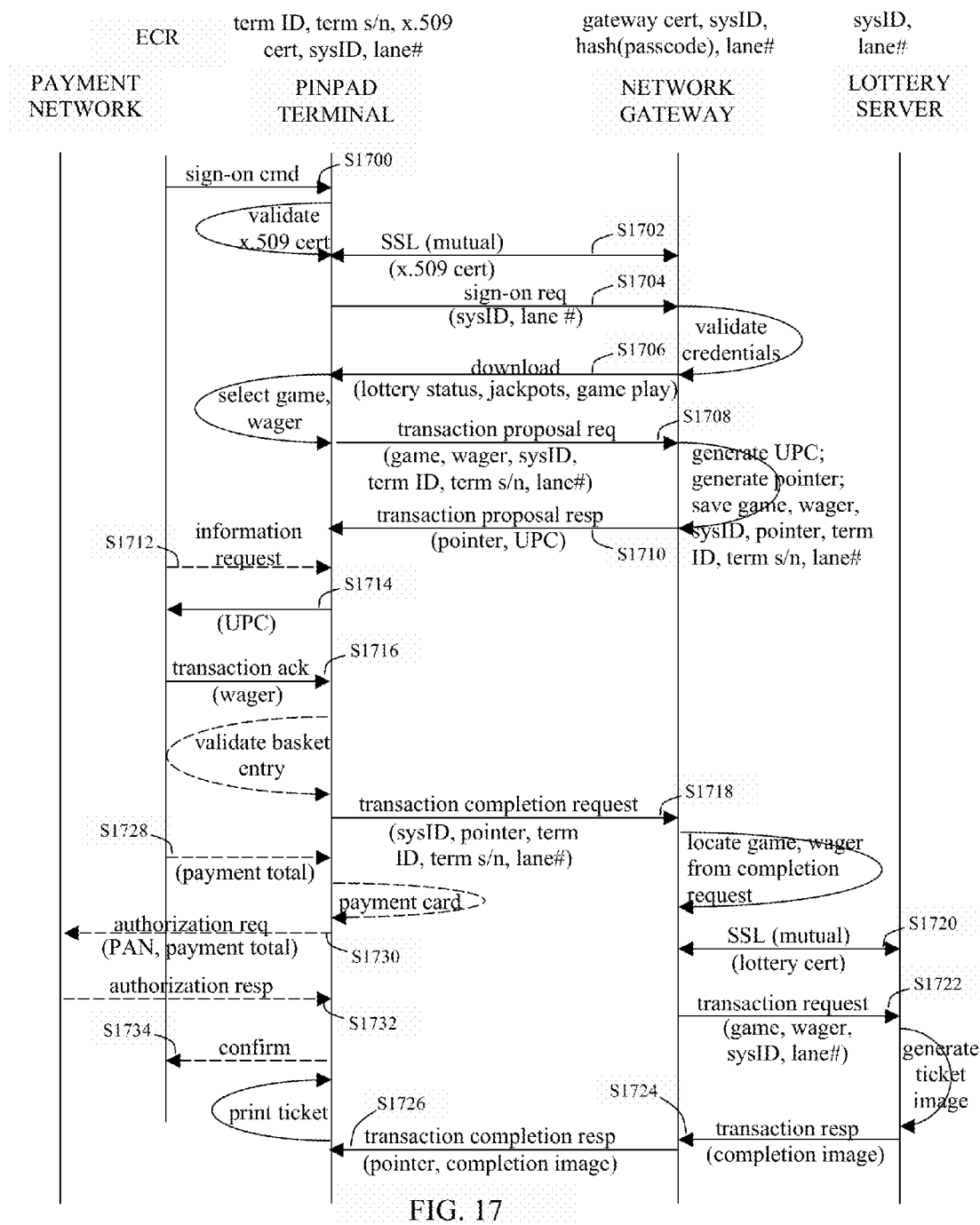
FIG. 17 is a detailed message flow diagram that depicts a fourth alternate embodiment of the transaction processing method.

An alternate transaction processing method, in which the transaction completion image (lottery ticket image) is downloaded to the pin-pad terminal 200 while the electronic shopping basket of the ECR 250 is open, and before the checkout processor has calculated the total payment amount owed and the network gateway 400 has received confirmation that that the customer has paid for the proposed transaction with the network device 500 (lottery server), is depicted in FIG. 17.

Steps S1700 to S1714 correspond to steps S1500 to S1514 and, therefore, will not be discussed in detail. At step S1714, the transaction processor 220 of the pin-pad terminal 200 electronically transmits the UPC to the ECR 250, either in response to a transaction information request from the ECR 250 or without waiting for a transaction information request from the ECR 250. The checkout processor of the ECR 250 then inputs into the electronic shopping basket the price (wager amount) of the proposed transaction with the network device 500 (lottery server).

After the checkout processor inputs the price (wager amount) into the electronic shopping basket, and while the electronic shopping basket is still open (i.e. without waiting for the electronic shopping basket to close), at step S1716 the checkout processor of the ECR 250 transmits to the pin-pad terminal 200 a transaction acknowledgement message that identifies the price (and/or product code) of the proposed transaction. Therefore, in contrast to the embodiment discussed above with reference to FIG. 15, the pin-pad terminal 200 receives from the ECR 250 the payment amount for the proposed transaction before the ECR 250 receives confirmation of payment for any of the items entered in the electronic shopping basket.

Upon receipt of the transaction acknowledgement message, the transaction processor 220 may optionally proceed to validate the entry in the electronic shopping basket for the proposed transaction by comparing the price (and/or product code) identified in the transaction acknowledgement message against the price (and/or product code) specified in the UPC of the transaction proposal response (received at step S1710). If the price (product code) identified in the transaction acknowledgement message does not match the price (product code) specified in the transaction proposal response, the transaction processor 220 may print an error message notifying the operator of the ECR 250 of the discrepancy between the two price amounts (two product codes) for the proposed transaction.

Steps S1718 to S1726 correspond to steps S1526 to S1534 and, therefore, will not be discussed in detail. Therefore, at step S1718, the transaction processor 220 generates a transaction completion request message (i.e. a download authorization request) that requests completion of the proposed transaction (e.g. lottery ticket image) with the network device 500 (and includes the transaction pointer), and transmits the transaction completion request to the network gateway 400 over the encrypted channel. Therefore, in contrast to the embodiment discussed above with reference to FIG. 15, the pin-pad terminal 200 transmits the transaction pointer before receiving from the ECR 250 confirmation of payment for any items entered in the electronic shopping basket.

In response to the transaction completion request message, the gateway authenticator 414 establishes an encrypted communications channel with the lottery server 500 via the second communications network 104 at step S1720, generates a transaction request message that specifies the selected lottery game and price (wager amount), and transmits the transaction request message to the network device 500 at step S1722.

After validating the transaction request message, the network device 500 generates a transaction response message that includes a transaction completion image that provides confirmation of completion of the proposed transaction (e.g. a lottery ticket image that depicts the generated game numbers/indicia), and downloads the transaction response message to the network gateway 400 at step S1724. The gateway authenticator 414 generates a transaction completion response message that preferably includes the transaction pointer and the transaction completion image, and downloads the transaction completion response message to the pin-pad terminal 200 in response to the transaction completion request at step S1726. Preferably, the transaction processor 220 then deletes the transaction proposal response (transaction pointer and the associated UPC) from the memory 214, and prints the transaction completion image (lottery ticket image) that was included with the transaction completion response.

After the checkout processor of the ECR 250 transmits to the pin-pad terminal 200 the transaction acknowledgement message for the proposed transaction with the network device 500 (step S1716) and the operator of the ECR 250 finishes inputting into the electronic shopping basket the particulars of all the merchant's goods/services that are being purchased by the customer, the operator commands the checkout processor to close the electronic shopping basket and the checkout processor calculates the total amount owed for the proposed transaction with the network device 500 and the merchant's goods/services (if any) listed in the electronic shopping basket. The checkout processor may then transmit to the pin-pad terminal 200 an indication of the total payment amount owed, at step S1728. As above, the total payment amount is at least equal to the price (wager amount) specified in the transaction proposal response (received at step S1710).

Upon receipt of the total payment amount indication, preferably the transaction processor 220 of the pin-pad terminal 200 invokes the payment processor 216 to thereby allow the customer to provide electronic payment for the proposed transaction and for the merchant's goods/services, via the acquirer network 106.

Steps S1730 to S1734 correspond to steps S1518 to 1522 and, therefore, will not be described in detail. After the customer interfaces the customer's payment card with the contact/contactless token interface 209 of the pin-pad terminal 200 and provides any required customer credentials (e.g. personal identification number), the payment processor 216 may transmit over the acquirer network 106, at step S1730, an authorization request that specifies the total payment amount and the payment account information. The payment processor 216 receives an authorization response from the acquirer network 106 at step S1732, and may provide the transaction processor 220 with a successful payment confirmation message confirming that the customer successfully provided payment in the total payment amount.

Upon receiving the successful payment confirmation message, at step S1734 the transaction processor 220 may transmit to the ECR 250 a payment confirmation message confirming that the customer successfully provided payment in the total payment amount. In response, at step S1736, the ECR 250 may transmit a print authorization message to the pin-pad terminal 200 (unless the transaction processor 220 printed the transaction completion image in response to the transaction completion response message at step S1726), and the transaction processor 220 may then delete the transaction proposal response (transaction pointer and the associated UPC) from the memory 214 and print the transaction completion image (lottery ticket image) that was included with the transaction completion response.

Alternately, instead of providing electronic payment via the acquirer network 106, the customer may provide cash payment for the proposed transaction and the merchant's goods/services (if any). In response to the cash payment, at step S1736 the ECR 250 may transmit the print authorization message to the pin-pad terminal 200 without performing steps S1728 to S1734.

Steps S1716 to S1726 may be performed in parallel with steps S1728 to S1734. Therefore, the transaction completion image can be downloaded to the pin-pad terminal 200 while the electronic shopping basket is still open, or at least before the ECR 250 receives the payment confirmation message from the pin-pad terminal 200 or the customer provides cash payment for the total payment amount. As a result, the time required to complete the transaction processing method of FIG. 17 may be less than that required by the embodiment of FIG. 15.

What is claimed is:

1. A method of downloading an electronic product to a pin-pad terminal, the pin-pad terminal being coupled to an electronic cash register and including a transaction processor and a payment processor, the method comprising:
   the transaction processor transmitting to a network gateway a transaction proposal for an electronic product, and receiving from the network gateway a transaction proposal response generated by the network gateway in response to the transaction proposal, the transaction proposal response including a transaction pointer associated with the electronic product and further including an indication of a payment amount for the electronic product;
   the transaction processor electronically directly transmitting to the electronic cash register the indication of a payment amount for the electronic product;
   the transaction processor receiving from the electronic cash register a total payment amount including at least the payment amount for the electronic product;
   the payment processor receiving confirmation of payment of the total payment amount;
   the transaction processor transmitting the transaction pointer to a network device via the network gateway; and
   the transaction processor receiving the electronic product from the network device via the network gateway.

2. The method according to claim 1, wherein the transmitting the transaction pointer to the network device comprises the transaction processor transmitting the transaction pointer after the transaction processor receiving from the electronic cash register confirmation of entry of the electronic product in an electronic shopping basket maintained by the electronic cash register, and the transaction processor validating the confirmation of entry of the electronic product from a comparison with the payment amount indication.

3. The method according to claim 2, wherein the confirmation of entry of the electronic product includes a price amount.

4. The method according to claim 3, wherein the receiving from the network gateway a transaction proposal response comprises the transaction processor saving the transaction proposal response in a memory of the pin-pad terminal, and the validating the confirmation of entry of the electronic product comprises the transaction processor purging the transaction proposal response from the memory after a successful comparison of the price amount with the payment amount indication.

5. The method according to claim 1, wherein the transmitting the transaction pointer to the network device comprises the transaction processor transmitting the transaction pointer before the payment processor receiving from the electronic cash register the confirmation of payment of the total payment amount.

6. The method according to claim 1, wherein the transmitting the transaction pointer to the network device comprises the transaction processor transmitting the transaction pointer after the payment processor receiving from the electronic cash register the confirmation of payment of the total payment amount.

7. The method according to claim 1, wherein the transaction processor receiving the electronic product comprises the transaction processor receiving the electronic product after authenticating to the network gateway.

8. The method according to claim 1, wherein the transaction processor receiving the electronic product comprises the transaction processor receiving the electronic product after authenticating to the network device.

9. The method according to claim 8, wherein the transaction proposal includes at least one terminal credential associated with the pin-pad terminal and an administrator credential associated with an administrator of the pin-pad terminal, and the authenticating to the network device comprises the transaction processor authenticating to the network device with the least one terminal credential and the administrator credential.

10. The method according to claim 1, wherein the transaction proposal is not derivable from the transaction pointer.

11. A pin-pad terminal, comprising:
   a cash register interface configured to interface the pin-pad terminal with an electronic cash register; and
   a transaction processor and a payment processor in communication with the cash register interface,
   the transaction processor being configured to (i) transmit to a network gateway a transaction proposal for an electronic product, and receive from the network gateway a transaction proposal response generated by the network gateway in response to the transaction proposal, the transaction proposal response including a transaction pointer associated with the electronic product and further including an indication of a payment amount for the electronic product; (ii) electronically directly transmit to the electronic cash register the indication of a payment amount for the electronic product; and (iii) electronically receive from the electronic cash register a total payment amount including at least the payment amount for the electronic product;
   the payment processor being configured to receive confirmation of payment of the total payment amount; and
   the transaction processor being further configured to (iv) transmit the transaction pointer to a network device via the network gateway; and (v) download the electronic product from the network device via the network gateway.

12. The pin-pad terminal according to claim 11, wherein the transaction processor is configured to transmit the transaction pointer after receiving from the electronic cash register confirmation of entry of the electronic product in an electronic shopping basket maintained by the electronic cash register, and validating the confirmation of entry of the electronic product from a comparison with the payment amount indication.

13. The pin-pad terminal according to claim 12, wherein the confirmation of entry of the electronic product includes a price amount.

14. The pin-pad terminal according to claim 13, wherein the transaction processor is configured to save the transaction proposal response in a memory of the pin-pad terminal, and to purge the transaction proposal response from the memory after a successful comparison of the price amount with the payment amount indication.

15. The pin-pad terminal according to claim 11, wherein the transaction processor is configured to transmit the transaction pointer before receiving from the electronic cash register the confirmation of payment of the total payment amount.

16. The pin-pad terminal according to claim 11, wherein the transaction processor is configured to transmit the transaction pointer after receiving from the electronic cash register the confirmation of payment of the total payment amount.

17. The pin-pad terminal according to claim 11, wherein the transaction processor is configured to receive the electronic product after authenticating to the network gateway.

18. The pin-pad terminal according to claim 11, wherein the transaction processor is configured to receive the electronic product after authenticating to the network device.

19. The pin-pad terminal according to claim 18, wherein the transaction proposal includes at least one terminal credential associated with the pin-pad terminal and an administrator credential associated with an administrator of the pin-pad terminal, and the transaction processor is configured to authenticate to the network device with the least one terminal credential and the administrator credential.

20. A computer-readable medium comprising non-transient computer processing instructions stored thereon for execution by a pin-pad terminal, the computer processing instructions comprising a transaction processor and a payment processor when executed by the pin-pad terminal, the transaction processor and the payment processor causing the pin-pad terminal to perform a sequence comprising:
the transaction processor transmitting to a network gateway a transaction proposal for an electronic product, and receiving from the network gateway a transaction proposal response generated by the network gateway in response to the transaction proposal, the transaction proposal response including a transaction pointer associated with the electronic product and further including an indication of a payment amount for the electronic product;
the transaction processor electronically directly transmitting to an electronic cash register coupled to the pin-pad terminal the indication of a payment amount for the electronic product;
the transaction processor receiving from the electronic cash register a total payment amount including at least the payment amount for the electronic product;
the payment processor receiving confirmation of payment of the total payment amount;
the transaction processor transmitting the transaction pointer to a network device via the network gateway; and
the transaction processor receiving the electronic product from the network device via the network gateway.

21. The computer-readable medium according to claim 20, wherein the transaction proposal response includes the payment amount indication, and the transmitting the transaction pointer to the network device comprises the transaction processor transmitting the transaction pointer after the transaction processor receiving from the electronic cash register confirmation of entry of the electronic product in an electronic shopping basket maintained by the electronic cash register, and the transaction processor validating the confirmation of entry of the electronic product from a comparison with the payment amount indication.

22. The computer-readable medium according to claim 21, wherein the confirmation of entry of the electronic product includes a price amount.

23. The computer-readable medium according to claim 22, wherein the receiving from the network gateway a transaction proposal response comprises the transaction processor saving the transaction proposal response in a memory of the pin-pad terminal, and the validating the confirmation of entry of the electronic product comprises the transaction processor purging the transaction proposal response from the memory after a successful comparison of the price amount with the payment amount indication.

24. The computer-readable medium according to claim 20, wherein the transmitting the transaction pointer to the network device comprises the transaction processor transmitting the transaction pointer before the payment processor receiving from the electronic cash register the confirmation of payment of the total payment amount.

25. The computer-readable medium according to claim 20, wherein the transmitting the transaction pointer to the network device comprises the transaction processor transmitting the transaction pointer after receiving from the electronic cash register the confirmation of payment of the total payment amount.

26. The computer-readable medium according to claim 20, wherein the receiving the electronic product comprises the transaction processor receiving the electronic product after authenticating to the network gateway.

27. The method according to claim 1, wherein the payment processor receiving confirmation of payment comprises the payment processor transmitting over an acquirer network an authorization request identifying the total payment amount, and receiving an authorization response from the acquirer network in response to the authorization request, the authorization response confirming the payment of the total payment amount.

28. The method according to claim 1, wherein the transaction processor receiving a total payment amount comprises the electronic cash register including in an electronic shopping basket maintained by the electronic cash register the payment amount for the electronic product and a price of at least one item other than the electronic product, calculating the total payment amount from the payment amount for the electronic product and the price of the at least one item, and providing the transaction processor with the calculated total payment amount.

29. The pin-pad terminal according to claim 11, wherein the payment processor is configured to transmit over an acquirer network an authorization request identifying the total payment amount, and receive an authorization response from the acquirer network in response to the authorization request, the authorization response confirming the payment of the total payment amount.

* * * * *